(12) United States Patent
Sumio

(10) Patent No.: US 8,355,149 B2
(45) Date of Patent: Jan. 15, 2013

(54) INFORMATION PROCESSING APPARATUS, CONTROL METHOD THEREOF, AND PROGRAM

(75) Inventor: Hiroshi Sumio, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1405 days.

(21) Appl. No.: 11/471,567

(22) Filed: Jun. 21, 2006

(65) Prior Publication Data

US 2006/0290979 A1    Dec. 28, 2006

(30) Foreign Application Priority Data

Jun. 24, 2005  (JP) ................................. 2005-185215

(51) Int. Cl.
G06F 3/12    (2006.01)
B41J 13/00   (2006.01)

(52) U.S. Cl. ........................ 358/1.15; 358/1.13; 400/578

(58) Field of Classification Search ........................ None
See application file for complete search history.

(56) References Cited

U.S. PATENT DOCUMENTS

| | | | |
|---|---|---|---|
| 7,079,272 B2* | 7/2006 | Hatayama | 358/1.15 |
| 2001/0053304 A1* | 12/2001 | Noda | 400/578 |
| 2002/0036799 A1* | 3/2002 | Sumiyama et al. | 358/1.15 |
| 2002/0051192 A1* | 5/2002 | Utsunomiya | 358/1.15 |
| 2003/0107764 A1* | 6/2003 | Takei | 358/1.15 |
| 2004/0046992 A1* | 3/2004 | Mori et al. | 358/1.15 |

FOREIGN PATENT DOCUMENTS

| | | |
|---|---|---|
| JP | 10-198540 A | 7/1998 |
| JP | 2002-108596 | 4/2002 |
| JP | 2003-248568 A | 9/2003 |
| JP | 2004-046774 A | 2/2004 |

OTHER PUBLICATIONS

Japanese Office Action dated Jun. 18, 2010 concerning Japanese patent Application No. 2005-185215.

* cited by examiner

*Primary Examiner* — Marivelisse Santiago Cordero
*Assistant Examiner* — Huo Long Chen
(74) *Attorney, Agent, or Firm* — Fitzpatrick, Cella, Harper & Scinto

(57) ABSTRACT

Pieces of device information of a plurality of printing apparatuses, including about paper feed stages provided in the printing apparatuses, are acquired. On the basis of the acquired device information and print data to be processed which includes pages to be printed on different types of paper sheets, a printing apparatus capable of printing the print data without paper exchange during printing is selected.

11 Claims, 32 Drawing Sheets

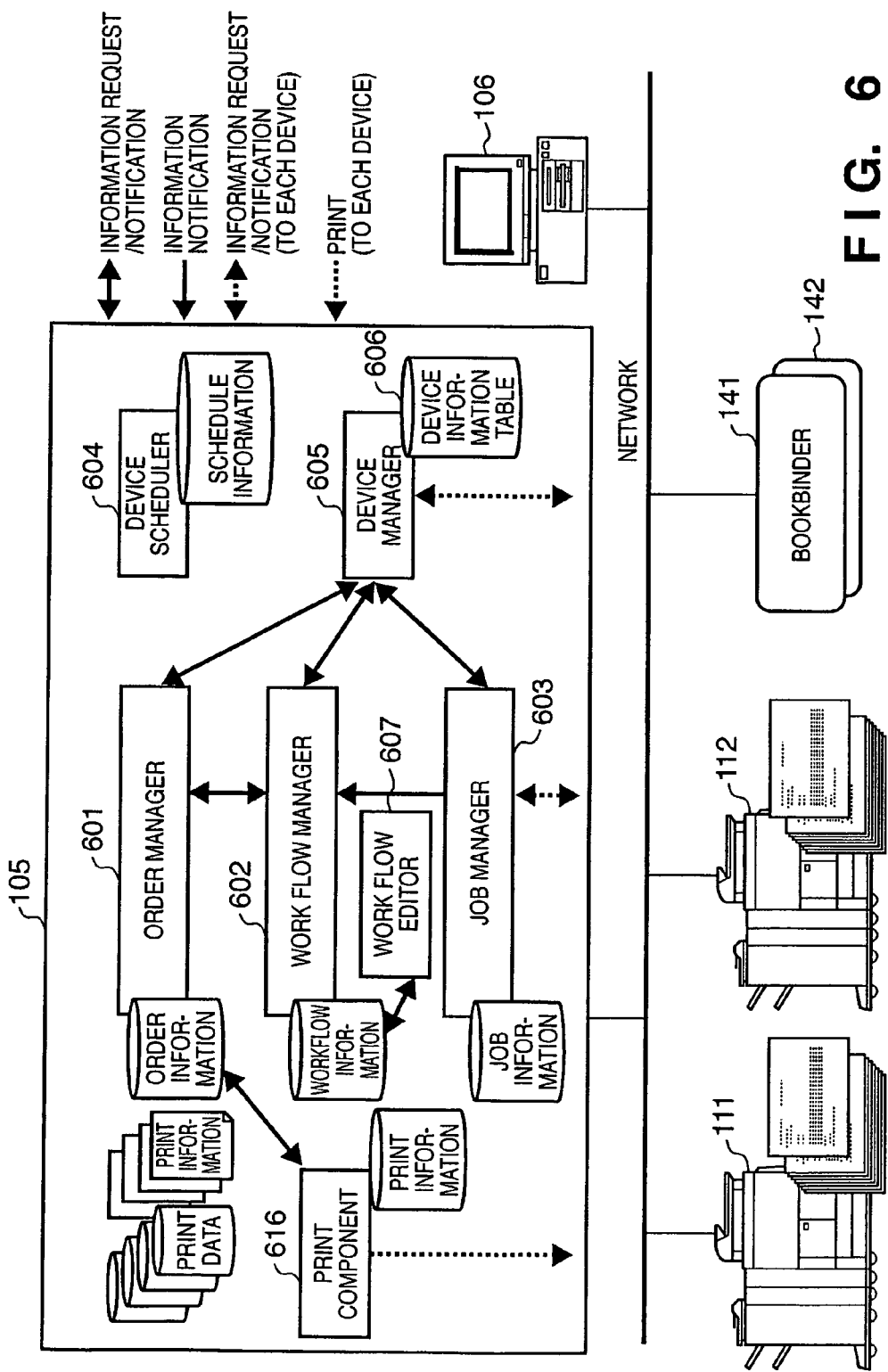

FIG. 7

ORDER MANAGER

FILE(E) VIEW(V) SETTING(S) ORDER(O)

DISPLAY LIST [ORDER IN PROCESSING ▼]   SWITCH USER VIEW [ALL ▼]   LOGIN USER: KATO

701

| ORDER SUBJECT | ORDER ID | PERSON IN CHARGE | PROCESSING STATUS | SCHEDULED DATE OF DELIVERY |
|---|---|---|---|---|
| ⊕◉ STANDARD TEST PATTERN | 00000005 | so001 | PERSON IN CHARGE IS UNASSIGNED | |
| ☐ SUB-ORDER 001 | | | WAIT FOR APPROVAL OF ESTIMATE | 2003/05/25 |
| ⊕◆ SPECIFICATIONS | 00000011 | so001 | | |
| ☐ SUB-ORDER 001 | | | PERSON IN CHARGE IS UNASSIGNED | |
| ⊕◉ WITH CARRY-IN MEDIUM | 00000020 | | DETERMINE ORDER | 2003/05/05 |
| ⊕◉ SPECIFICATION 2 | 00000022 | | | |

702

BASIC INFORMATION | DELIVERY INFORMATION

[ESTIMATE] [☒ WAIT FOR APPROVAL OF ESTIMATE] [✉ COMPLETE ORDER] [SWITCH PERSON IN CHARGE] [▼] [⟳ UPDATE]
[CONNECT TO SERVER] [✉ MAIL TO CLIENT]

[ORDER INFORMATION]
 ORDER ID : 00000005
 ORDER NAME : STANDARD TEST PATTERN MATERIAL
 NUMBER OF SUB ORDERS : 1
 DATE OF ORDER : 2003-04-07T09:25:15
 DESIRED DATE OF DELIVERY :
 SCHEDULED DATE OF DELIVERY :
 REQUEST ITEMS :
[CLIENT INFORMATION]
 NAME OF ORDERER : KANEKO
 ZIP :
 Address :
 TEL :
 E-MAIL :

[NOTE]   UNDER CREATION

DEVICE SCHEDULER

FILE(F)　VIEW(V)　MANAGEMENT LINE(C)　SCHEDULE(E)　SETTING(S)　HELP(H)

UPDATE SCHEDULE

| 2003 MAY | | | | | | |
|---|---|---|---|---|---|---|
| SUN | MON | TUE | WED | THU | FRI | SAT |
| 27 | 28 | 29 | 30 | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |
| 1 | 2 | 3 | 4 | 5 | 6 | 7 |

TODAY: 2003/05/30

LINE INFORMATION
LINE NAME: HIGH-SPEED PRINTER
TYPE: MONOCHROME PRINTER
LOCATION: AISLE-SIDE (NORTH)
PROCESSING SPEED: 100 SHEETS/MIN
COMMENT:

RESERVATION INFORMATION
SUBJECT: SPECIFICATIONS
TYPE: NORMAL RESERVATION
DATE/TIME: 2003/05/30
　　　　　0345 – 10:00
RESERVER: NORI KATO
OPERATOR: AKIRA KIDA
NOTE 1001　1002　1003

DAY | WEEK

| TIME | 8 | 9 | 10 | 11 | 12 | 13 | 14 | 15 | 16 | 17 | 18 |
|---|---|---|---|---|---|---|---|---|---|---|---|
| HIGH-SPEED PRINTER | | SPECIFICATIONS AKIRA KIDA | | | MANUAL TARO YAMADA | | | | | | |
| COLOR PRINTER | | | | BROCHURE ICHIRO SUZUKI | | | | | | | |
| MEDIUM-SPEED PRINTER 1 | | ROUTINE MAINTENANCE, KONISHI | | | | CLASS MATERIAL AKIRA KIDA | | | | | |
| MEDIUM-SPEED PRINTER 2 | | | | | | | | | | | |
| MEDIUM-SPEED PRINTER 3 | | | | | | | | | | | |
| MEDIUM-SPEED PRINTER 4 | | | | | | | | | | | |
| MEDIUM-SPEED PRINTER 5 | | | | | | | | | | | |

| | ITEMS | | MEANING (SET VALUE) |
|---|---|---|---|
| WHOLE ORDER INFORMATION | SERVICE TYPE | | OUTPUT/BINDING SERVICE |
| | | | POSTER/PANEL |
| | | | COPY SERVICE |
| | | | RE-ORDER |
| | | | SAVE DOCUMENT |
| | ORDER NAME | | ARBITRARY CHARACTER STRING |
| | ORDER ID | | 32-BYTE UNIQUE CHARACTER STRING |
| | ENTRY METHOD | | NETWORK ENTRY |
| | | | MEDIA ENTRY |
| | FINISHING METHOD | | ONE FILE → ONE DOCUMENT |
| | | | MULTIPLE FILES → ONE DOCUMENT |
| | | | MULTIPLE FILES → MULTIPLE DOCUMENTS |

FIG. 14B

| | NUMBER OF UPLOADED FILES | NUMBER OF ENTERED FILES |
|---|---|---|
| FILE INFORMATION | NAME OF UPLOAD FILE | ARBITRARY CHARACTER STRING |
| | FILE ID | 32-BYTE UNIQUE CHARACTER STRING |
| | NUMBER OF PAGES | NUMERICAL VALUE DESIGNATION |
| | OS TYPE | Windows/Macintosh/Unix |
| | DOCUMENT CREATION APPLICATION | Microsoft Word |
| | | Microsoft Excel |
| | | ... |
| | | OTHER |
| | APPLICATION VERSION | ARBITRARY CHARACTER STRING |

F I G. 14C

| PRINT STYLE | FINISHING SIZE | B0, A0, B1, A1, , |
| --- | --- | --- |
| | DIRECTION OF OUTPUT PAPER | PORTRAIT |
| | | LANDSCAPE |
| | TYPE OF BINDING | CASE BINDING |
| | | SADDLE STITCHING |
| | | RING BINDING |
| | | STAPLE |
| | | OTHER (COMMENT) |
| | DIRECTION OF BINDING | LEFT (WIDTH UNDESIGNATED) |
| | | RIGHT (WIDTH UNDESIGNATED) |
| | | UPPER (WIDTH UNDESIGNATED) |
| | | OTHER (COMMENTS) |
| | PRINT (TEXT) | ONE-SIDED |
| | | DOUBLE-SIDED |
| | COLOR MODE (TEXT) | MONOCHROME |
| | | COLOR |

FIG. 14D

| PRINT STYLE | PAPER TYPE (TEXT) | MONOCHROME STANDARD PAPER |
| --- | --- | --- |
| | | COLOR STANDARD PAPER |
| | | CARDBOARD (THICKNESS CAN BE DESIGNATED) |
| | | GLOSSY CARDBOARD |
| | | COLOR PAPER (COLOR CAN BE DESIGNATED) |
| | | MONOCHROME OHP FILM |
| | | COLOR OHP FILM |
| | PUNCH HOLE | 2 HOLES, 3 HOLES, 4 HOLES, 6 HOLES, 30 HOLES,... |
| | FOLDING | TWO-FOLD, THREE-FOLD, X-FOLD |
| | FRONT COVER | PUT COVER |
| | | PUT NO COVER |
| | PRINT (FRONT COVER) | NO PRINT |
| | | ONE-SIDED |
| | | DOUBLE-SIDED |
| | PRINT (BACK COVER) | NOT PRINT |
| | | SINGLE-SIDED |
| | | DOUBLE-SIDED |
| | COLOR MODE (COMMON TO FRONT AND BACK COVERS) | MONOCHROME |
| | | COLOR |

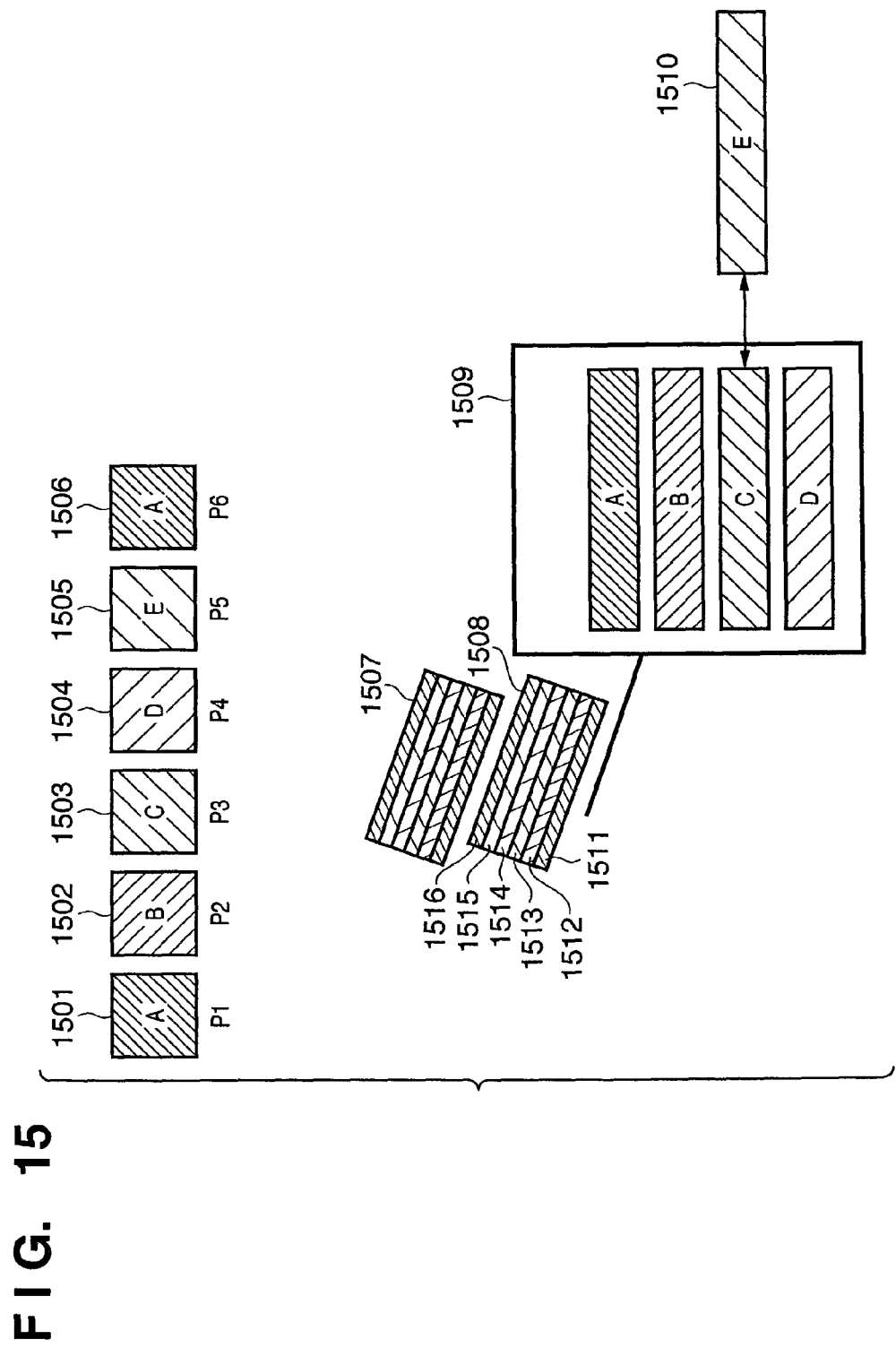

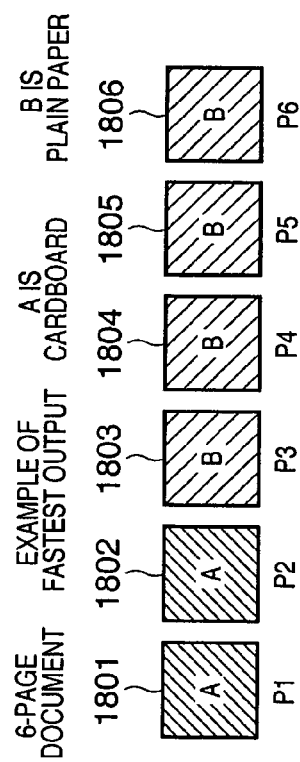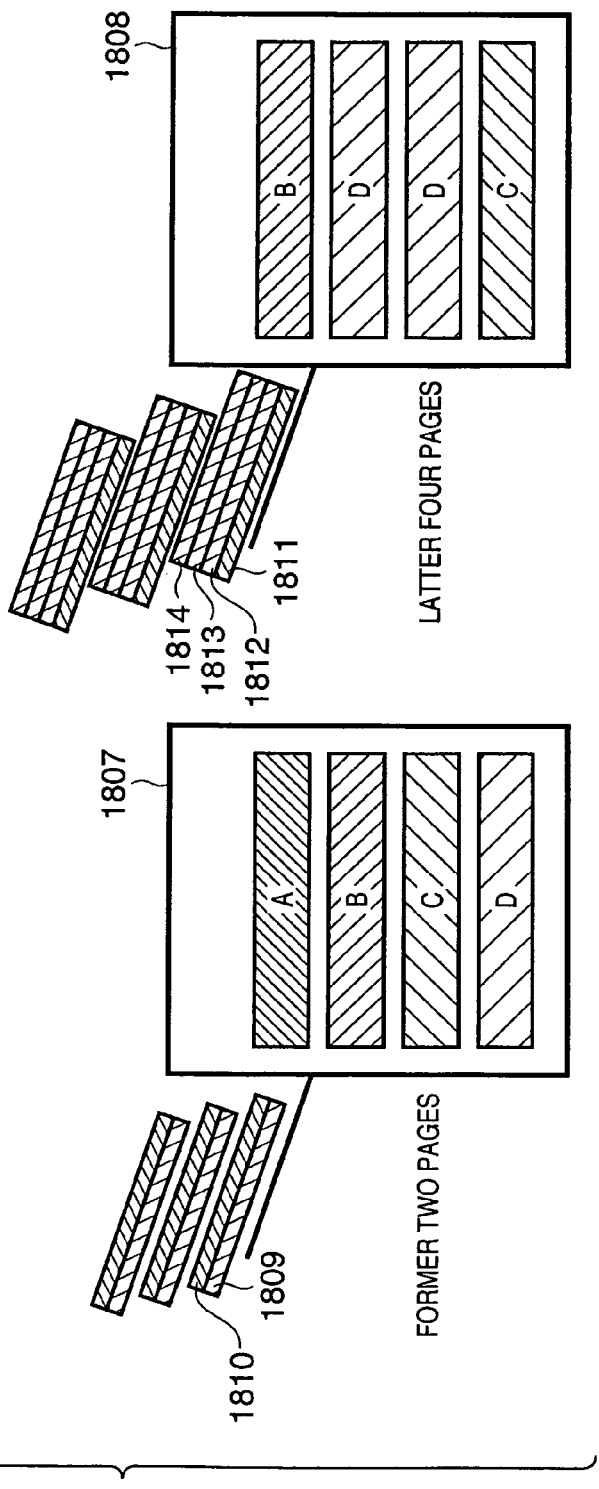
FIG. 21

FIG. 22

| | | | PRESET |
|---|---|---|---|
| COMBINATION 1 | OUTPUT DEVICE 1 | OUTPUT DEVICE 2 | NO |
| COMBINATION 2 | OUTPUT DEVICE 1 | OUTPUT DEVICE 4 | NO |
| COMBINATION 3 | OUTPUT DEVICE 1 | OUTPUT DEVICE 3 | DEVICE 3 H OR E ⟶ D |

2201, 2202, 2203

F I G. 23

|  | CASSETTE 1 | CASSETTE 2 | CASSETTE 3 | CASSETTE 4 | SETTABLE |
|---|---|---|---|---|---|
| OUTPUT DEVICE 1 | PAPER TYPE A | PAPER TYPE B | NOT AVAILABLE | NOT AVAILABLE | E,F,G |
| OUTPUT DEVICE 2 | PAPER TYPE D | PAPER TYPE C | NOT AVAILABLE | NOT AVAILABLE | A |
| OUTPUT DEVICE 3 | PAPER TYPE H | PAPER TYPE C | PAPER TYPE B | PAPER TYPE E | D,G |
| OUTPUT DEVICE 4 | PAPER TYPE C | PAPER TYPE D | PAPER TYPE E | NOT AVAILABLE | B,F,G |

| | OUTPUT DEVICE 1807 | OUTPUT DEVICE 1808 | PROCESSING TIME |
|---|---|---|---|
| DIVISIONAL PROCESSING 1 | PAGES 1~2 : 2 MIN | PAGES 3~6 : 4 MIN | 4 MIN |
| DIVISIONAL PROCESSING 2 | PAGES 1~3 : 3 MIN | PAGES 4~6 : 3 MIN | 3 MIN |
| DIVISIONAL PROCESSING 3 | PAGES 1~4 : 3 MIN | PAGES 5~6 : 2 MIN | 3 MIN |

2401, 2402, 2403

F I G. 26
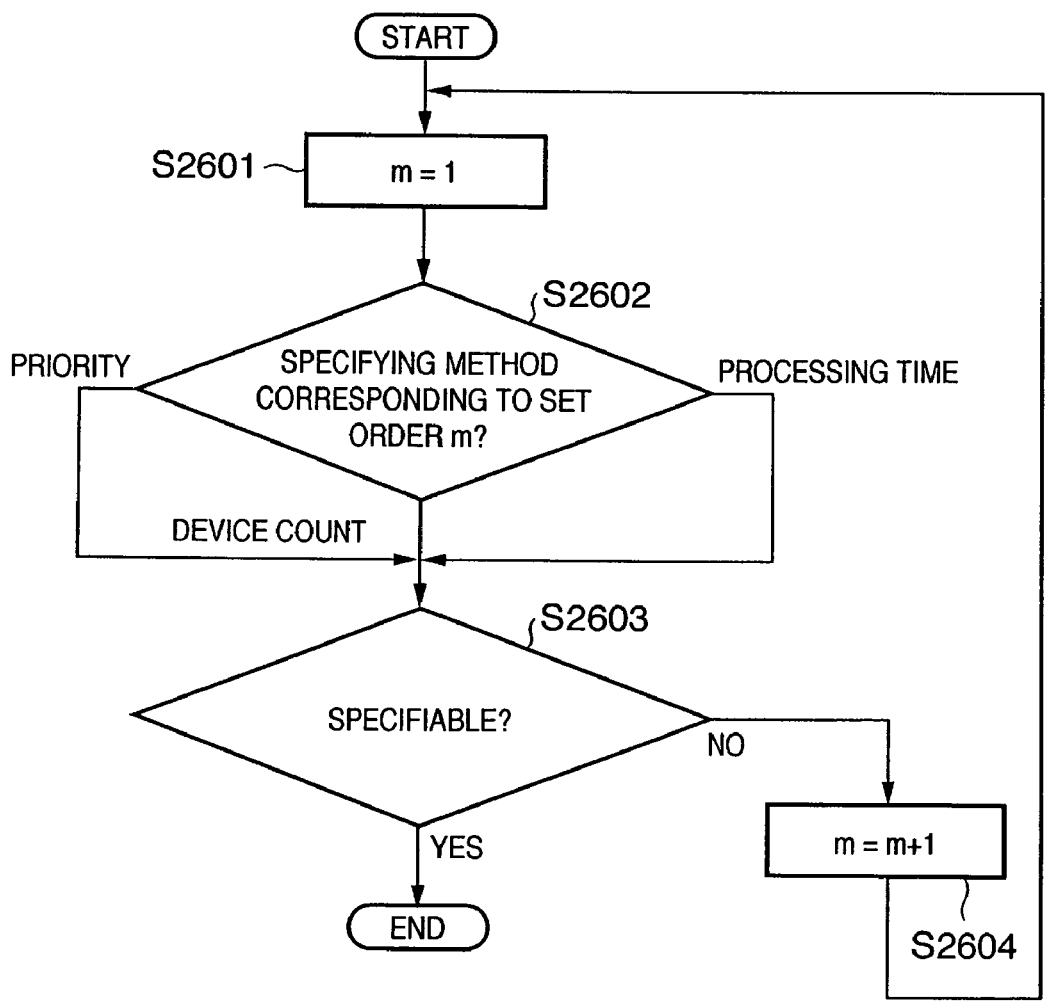

FIG. 27

| | PRIORITY | DEVICE COUNT | PROCESSING TIME |
|---|---|---|---|
| COMBINATION 1 | 5 | 2 | 10 MINUTES |
| COMBINATION 2 | 8 | 2 | 8 MINUTES |
| COMBINATION 3 | 7 | 2 | 5 MINUTES |

INFORMATION PROCESSING APPARATUS, CONTROL METHOD THEREOF, AND PROGRAM

FIELD OF THE INVENTION

The present invention relates to an information processing apparatus for selecting one of a plurality of printing apparatuses connected to a network as the print destination of print data to be processed, a control method thereof, and a program.

BACKGROUND OF THE INVENTION

There exist conventionally print shops which produce printed products on the basis of requests from customers such as private users and companies. A print shop receives print data (original) and instructions of style, number of copies, and delivery date, creates a printed product, and delivers it to the customer. The operation in the print shop is done by using a large-scale printing apparatus such as an offset plate-making printing press.

Along with the recent increase in speed and image quality of an electrophotographic printing apparatus or inkjet printing apparatus, commercial print businesses (print services) called "copy service", "printing service", and "Print On Demand (POD) center" capable of output/delivery in a short time have also emerged.

A user takes directly or sends by mail, to a print shop that provides the above-described print services, a document recorded on paper or electronic medium (e.g., FD, MO, or CD-ROM) and a print instruction (order instruction) containing the number of copies, binding style, and delivery date of the document, thereby requesting printing of the print shop (entry).

A print system that allows print order placement/reception through the Internet or an intranet has also been put into practical use. To use this print system, the user accesses from the computer of his/her own to a homepage provided by the print shop, fills a print request form with order sender information (e.g., the address of the recipient) and necessary items such as the print style and number of copies, and transmits the form together with the document file. With this operation, the user can place an order for printing of the document file.

Upon receiving the request from the user, the print shop creates a print instruction and schedules print processing. In accordance with the created schedule, printing is executed by a printer connected to a work computer. A finishing apparatus executes binding. The created printed product is delivered to the customer, and the operation is ended.

Such a print shop that executes print processing consigned by a user often deals with a job that produces a document (printed product) using a plurality of types of paper in a single document. When such a document is output by using a single output device, paper types set in the paper feed stages of the output device (e.g., printer) do not suffice, and cassette exchange frequently occurs at a high probability.

Japanese Patent Laid-Open No. 2002-108596 discloses a technique to reduce load in this cassette exchange. In Japanese Patent Laid-Open No. 2002-108596, a priority is given to each paper type. The order of paper types to be set is decided in accordance with the priorities. The paper type is exchanged in accordance with the to-be-set paper type order decided on the basis of the priorities, thereby decreasing the number of times of exchange.

In the Japanese Patent Laid-Open No. 2002-108596, a priority is set for each paper type, and print processing is executed once per paper type. For example, a print job which should be processed in an order of paper types A, B, C, D, A, and C is processed once per paper type, thereby decreasing the number of times of paper type exchange.

However, in a work flow system, the process schedule is created in advance, as described above. Hence, the processing order cannot be changed. As a result, even when Japanese Patent Laid-Open No. 2002-108596 is applied to the work flow system, the number of times of paper type exchange cannot be decreased. Hence, a control method that can be applied to a work flow system and reduces the number of times of paper type exchange without changing the processing order is demanded.

SUMMARY OF THE INVENTION

The present invention has been made to solve the above-described problem, and has as its object to provide an information processing apparatus which can select a combination of printing apparatuses capable of efficiently executing printing by decreasing the number of times of paper type exchange, a method thereof, and a program.

According to the present invention, the foregoing object is attained by providing an information processing apparatus for selecting a combination of printing apparatuses among a plurality of printing apparatuses as a print destination of print data to be processed, comprising:

storing means for storing device information about a paper feed stage provided in each printing apparatus; and selection means for selecting combinations of printing apparatuses to process the print data on the basis of the device information stored by the storing means and paper type information of a plurality of types of paper necessary for one print data of the print data to be processed, wherein the print data is divisionally output to each printing apparatus included in the combinations of printing apparatuses selected by the selection means without changing an order of pages of the print data.

In a preferred embodiment, the apparatus further comprises allocation means for allocating the print data to each printing apparatus included in the combination of printing apparatuses sodas to cause the combination of printing apparatuses selected by the selection means to execute print processing.

In a preferred embodiment, the selection means selects the combination of printing apparatuses including the plurality of types of paper necessary for the print data to be processed, on the basis of the paper type information of paper set in the paper feed stage provided in each printing apparatus so as to execute print processing without paper exchange.

In a preferred embodiment, the apparatus further comprises specifying means for specifying, from the combinations of printing apparatuses selected by the selection means, a combination of printing apparatuses to process the print data, the specifying means specifies, from the combinations of printing apparatuses selected by the selection means, a combination of printing apparatuses which minimizes the number of printing apparatuses included in the combination.

In a preferred embodiment, the specifying means specifies, from the combinations of printing apparatuses selected by the selection means, a combination of printing apparatuses which minimizes a print time.

In a preferred embodiment, the specifying means specifies, from the combinations of printing apparatuses selected by the selection means, a combination of printing apparatuses which maximizes a sum of priorities set for the printing apparatuses.

In a preferred embodiment, the apparatus further comprises transmitting means for transmitting exchange request information to request paper type exchange of a printing apparatus which should execute paper type exchange before print processing in a printing apparatus included in the combination of printing apparatuses, which includes the plurality of paper types necessary for the print data by exchanging the type of paper set in the paper feed stage before print processing.

In a preferred embodiment, if it is impossible to select the combination of printing apparatuses including the plurality of paper types necessary for the print data, the selection means selects a combination of printing apparatuses which minimizes the number of times of paper exchange.

In a preferred embodiment, the apparatus further comprises:

recognition means for recognizing a paper type to be set during print processing if it is impossible to select the combination of printing apparatuses including the plurality of paper types necessary for the print data; and set determination means for determining whether the paper type recognized by the recognition means can be set during print processing, wherein the selection means selects a combination to exchange the paper type determined by the set determination means to be settable.

In a preferred embodiment, when it is determined that the paper type to be set during print processing is in stock, the set determination means determines that the paper type is settable.

In a preferred embodiment, the apparatus further comprises acquisition means for acquiring the device information.

According to the present invention, the foregoing object is attained by providing a control method of an information processing apparatus for selecting a combination of printing apparatuses among a plurality of printing apparatuses as a print destination of print data to be processed, comprising:

a storing step of storing, in a storage medium, device information about a paper feed stage provided in each printing apparatus; and a selection step of selecting combination of printing apparatuses to process the print data on the basis of the device information stored in the storage medium in the storing step and paper type information of a plurality of types of paper necessary for one print data of the print data to be processed, wherein the print data is divisionally output to each printing apparatus included in the combination of printing apparatuses selected in the selection step without changing an order of pages of the print data.

According to the present invention, the foregoing object is attained by providing a program characterized by causing a computer to control an information processing apparatus for selecting a combination of printing apparatuses among a plurality of printing apparatuses as a print destination of print data to be processed, the computer executing:

a storing step of storing, in a storage medium, device information about a paper feed stage provided in each printing apparatus;

a selection step of selecting combination of printing apparatuses to process the print data on the basis of the device information stored in the storage medium in the storing step and paper type information of a plurality of types of paper necessary for one print data of the print data to be processed; and an output step of divisionally output the print data to each printing apparatus included in the combination of printing apparatuses selected in the selection step without changing an order of pages of the print data.

According to the present invention, an information processing apparatus which can select a combination of printing apparatuses capable of efficiently executing printing by decreasing the number of times of paper type exchange, a method thereof, and a program can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a view showing the functional arrangement of a server according to the embodiment of the present invention;

FIG. 7 is a view showing an example of the operation window of an order manager according to the embodiment of the present invention;

FIG. 10 is a view showing an example of a device scheduler according to the embodiment of the present invention;

FIGS. 14A to 14D are views showing an example of order information according to the embodiment of the present invention;

FIG. 15 is a view for explaining document output according to a prior art;

FIG. 21 is a view for explaining document output according to the embodiment of the present invention;

FIG. 22 is a view showing an example of an output device combination list according to the embodiment of the present invention;

FIG. 23 is a view showing an example of list information of paper types set in the paper feed stages of each output device according to the embodiment of the present invention;

FIG. 24 is a view showing an example of the list of processing times in divisional output according to the embodiment of the present invention;

FIG. 26 is a flowchart showing processing of deciding a method of specifying a combination to execute divisional processing according to the embodiment of the present invention;

FIG. 27 is a view showing an example of a combination candidate list according to the embodiment of the present invention.

DETAILED DESCRIPTION OF THE PREFERRED EMBODIMENT

A preferred embodiment of the present invention will be described in detail in accordance with the accompanying drawings.

Figure 1:
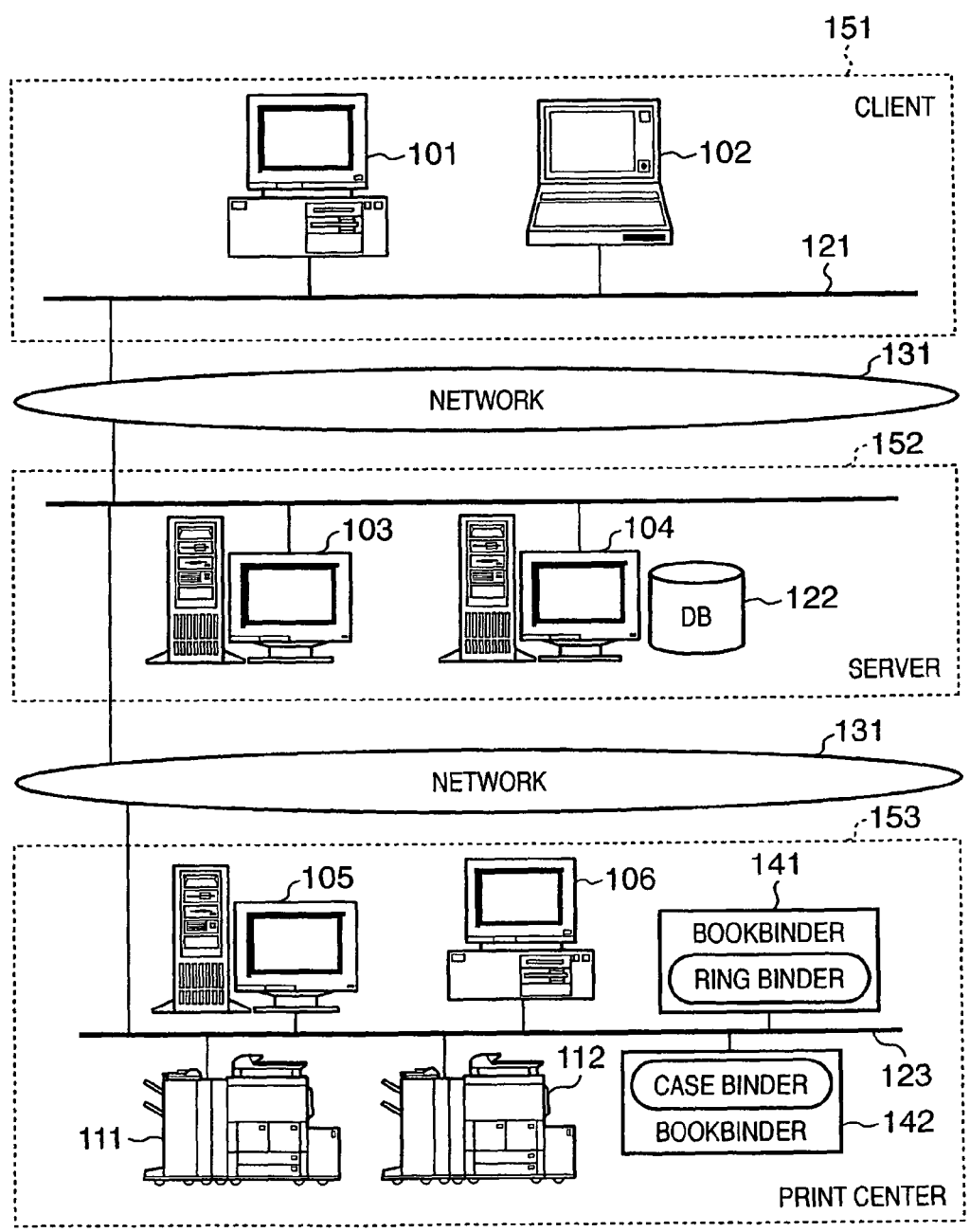
FIG. 1 is a view showing the entire configuration of a print system according to an embodiment of the present invention.

FIG. 1 is a view showing the entire configuration of a print system according to an embodiment of the present invention.

The environment of the entire print system to be explained below facilitates the understanding of the description of the present invention, and the present invention is not limited to this environment.

Referring to FIG. 1, a client location 151 includes a notebook PC (Personal Computer) 102 connected to a network in home or a PC 101 for business use which is connected to the intranet of a company. The PC 101 for business use or notebook PC 102 in the client location 151 is connected to a network 131 through a LAN 121.

A server location 152 includes an information processing apparatus for receiving print request data from the client location 151. The server location 152 includes a WEB server 103 which receives document data or provides an entered document content, and a DB server 104 which stores entered print request data as order sheet data (order slip) or stores digitally entered document data.

The WEB server 103 and DB server 104 can share one cabinet. In the present invention, however, they will be described as two cabinets for the descriptive convenience. The WEB server 103 and DB server 104 in the server location 152 are connected to the network 131 through a LAN 122.

A plurality of print centers 153 can exist in correspondence with the server location 152. The information processing apparatus in the server location 152 separately manages device information of various kinds of printing apparatuses installed in the print center 153. The print center 153 periodically collects, from the DB server 104, print request data and document data stored in the server location 152.

The print center 153 also includes a server 105 in which the print system of the present invention operates, and a work PC 106 which operates, using GUI, various kinds of services provided by the server 105. The print center 153 also includes a monochrome printer 111 and color printer 112 serving as an actual output destination, and bookbinders 141 (ring binding function) and 142 (case binding function) to be used for offline binding. The various kinds of devices installed in the print center 153, except the offline bookbinders 141 and 142, are connected to each other through a LAN 123 and also connected to the network 131 through the LAN 123.

The configuration and environment of the print center 153 are merely examples and are not limited to those shown in FIG. 1.

In this embodiment, the client location 151 and server location 152, and the server location 152 and print center 153 are connected through the network (e.g., Internet/intranet) 131. Normally, the client location 151 and server location 152 are connected through the Internet, and the server location 152 and print center 153 are connected through an intranet using a dedicated line. However, the present invention is not limited to this configuration and can also be applied to a configuration with the server location 152 existing in the print center 153.

The notebook PC 102 or PC 101 for business use in the client location 151 has a browser to browse received document contents provided by the WEB server 103. The browser is generally Microsoft Internet Explorer. Any other browser such as Netscape available from Netscape Communications Corporation can also be used. A user can upload document data by using the received document contents.

The WEB server 103 provides entry contents. The entry contents can be added a print style such as binding, print settings such as the number of copies and paper size, and information such as the delivery date, requester information, and delivery destination. The WEB server 103 is equipped with various kinds of controls for print request, including an edit control to add the pieces of information and a file designation control to upload document data.

Charge calculation (for chargeable printing) corresponding to the contents of an input request and input item determination processing are implemented by a service module that runs on the WEB server 103. However, these processing operations are general logic operations which are not directly related to the present invention, and a description thereof will be omitted. The WEB server 103 stores, in the DB server 104, order sheet data (containing the contents of a print request and the file name of document data) and document data corresponding to a determined print request.

A general database such as OracleDatabase available from Oracle Corporation is installed in the DB server 104. The DB server 104 can transmit desired print request data and document data in response to a data acquisition request from the server 105 (to be described later).

A DB schema (not shown) mainly includes a print center master (having information of a location and where to make contact and a device master and bookbinder master as members) table, device master (device configuration information including color/monochrome, print count, and options) table, and bookbinder master (information of a ring binder or case binder) table. The server 105 in the print center 153 can receive order sheet data allocated to the center by looking up the master tables.

The server 105 receives an order determination notification from the WEB server 103 and collects order sheet data and document data from the DB server 104. In accordance with the collected order sheet data, the server 105 operates a print system including an order manager, work flow manager, job manger, device manager, and device scheduler (to be described later).

The work PC 106 implements a console to control, through an operation window (GUI), various kinds of services provided by the server 105. The work PC 106 can extract document data stored in the server 105 through the console. The work PC 106 is a work information processing apparatus (computer) which activates a predetermined application to set the print style of acquired document data and input a print instruction on the basis of designated print settings. The installation configurations of the monochrome printer 111 and color printer 112 change depending on the print center 153. However, they generally include a high-speed monochrome printer and a high-resolution color printer. Print scheduling of the printers is done by the device scheduler in the server 105.

The bookbinders 141 and 142 are offline binders to bind printing paper sheets output from the monochrome printer 111 or color printer 112. The offline binders include, e.g., a stapler, puncher, case binder, and ring binder. When the bookbinders 141 and 142 are connected to a network, the server 105 can collect their statuses. The installation configurations of the bookbinders also change depending on the print center 153, like the printers.

The fundamental hardware configuration of each of the various kinds of terminals including the PC 101 for business use, notebook PC 102, WEB server 103, DB server 104, server 105, and work PC 106 will be described next with reference to FIG. 2.

Figure 2:
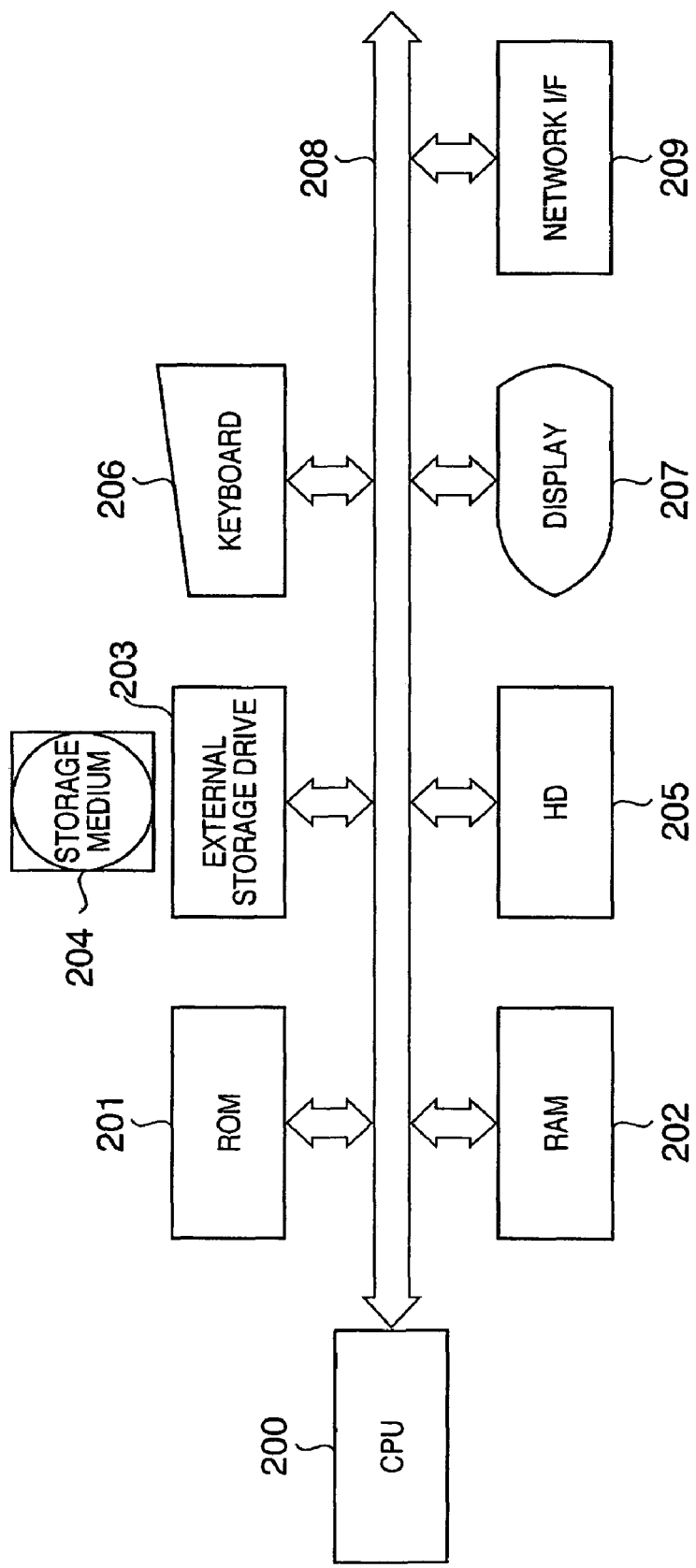
FIG. 2 is a block diagram showing the fundamental hardware configuration of a terminal according to the embodiment of the present invention.

FIG. 2 is a block diagram showing the fundamental hardware configuration of a terminal according to the embodiment of the present invention.

A CPU 200 executes various kinds of programs such as an application program, printer driver program, OS, and network printer control program stored in an HD (Hard Disk) 205. The CPU 200 also controls to temporarily store, in a RAM 202, data such as information and files necessary for execution of the programs.

A ROM 201 stores programs such as a basic I/O program and various kinds of data such as font data and template data to be used for document processing. The RAM 202 functions as the main memory and work area of the CPU 200. An external storage drive 203 can load data such as a program stored in a storage medium 204 to the computer system.

The storage medium 204 stores programs and related data to be described in this embodiment. The stored contents will be described later with reference to FIG. 4. As the storage medium 204, various kinds of storage media such as a CD-ROM, DVD-ROM/RAM/R/RW, MO, and IC memory card can be used.

The HD 205 stores various kinds of programs such as an application program, printer driver program, OS, control program, and related program. A keyboard 206 is used by the user to input an instruction such as a device control command to the terminal. A pointing device such as a mouse may be provided additionally.

A display 207 including a CRT or liquid crystal panel displays various kinds of information such as a command input from the keyboard 206 or pointing device (not shown) and a printer state. A system bus 208 connects the various kinds of components in the terminal to each other to serve as a data transmission/reception path. A network interface (I/F) 209 is a communication interface to connect a local area network (LAN) or Internet.

A memory map when a program to implement the present invention is loaded in an executable state in the RAM 202 will be described next with reference to FIG. 3.

Figure 3:
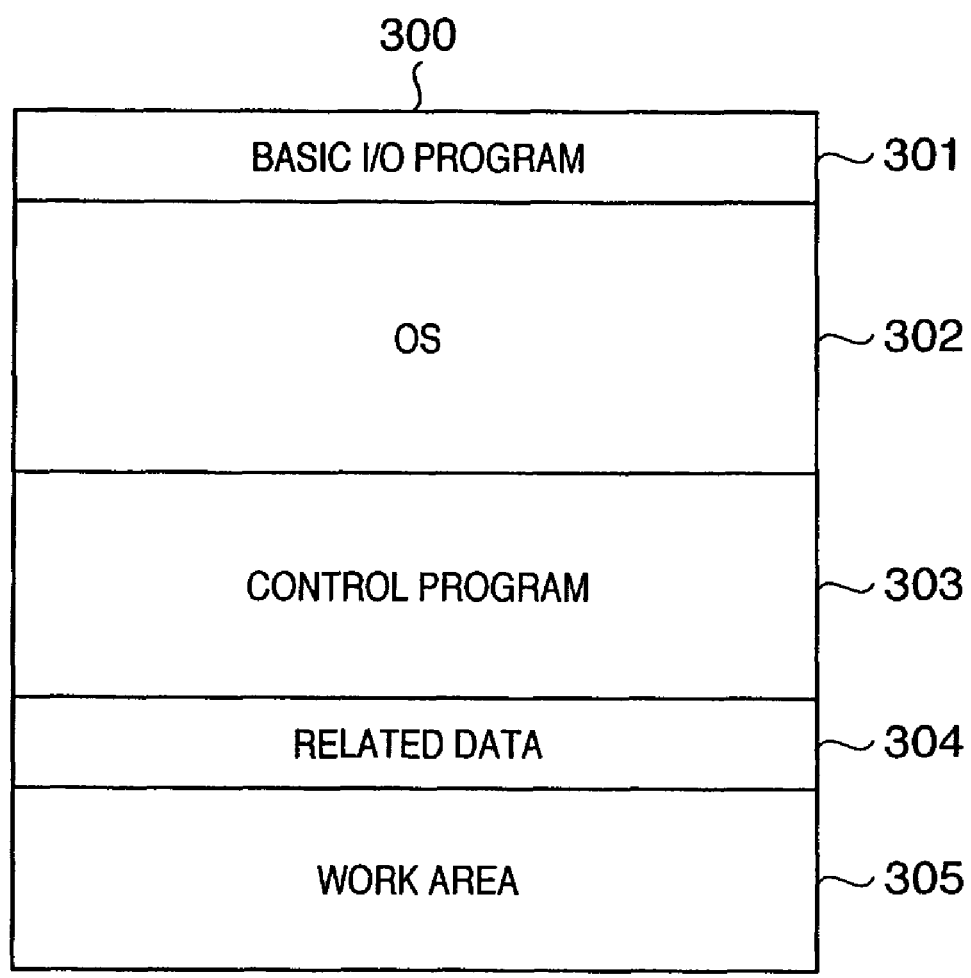
FIG. 3 is a view showing an example of the memory map of a RAM according to the embodiment of the present invention.

FIG. 3 is a view showing an example of the memory map of the RAM according to the embodiment of the present invention.

In this embodiment, an example will be described in which the CPU 200 directly loads programs and related data from the storage medium 204 to the RAM 202 and executes them. However, they may be loaded from the HD 205 to the RAM 202 every time the program of the present invention is to run from the storage medium 204. Alternatively, the program of the present invention may be recorded on the ROM 201 as a part of the memory map and executed directly by the CPU 200.

Referring to FIG. 3, an area 301 stores a basic I/O program. The basic I/O program is has, e.g., an IPL (Initial Program Loading) function of loading the OS from the HD 205 to the RAM 202 and starting the OS operation when the terminal is powered on. An area 302 stores the OS. An area 303 stores a control program. An area 304 stores related data (parameters and permanent data) associated with various kinds of programs such as the control program. An area 305 forms a work area where the CPU 200 executes the program.

The memory map of the storage medium 204 will be described next with reference to FIG. 4.

Figure 4:
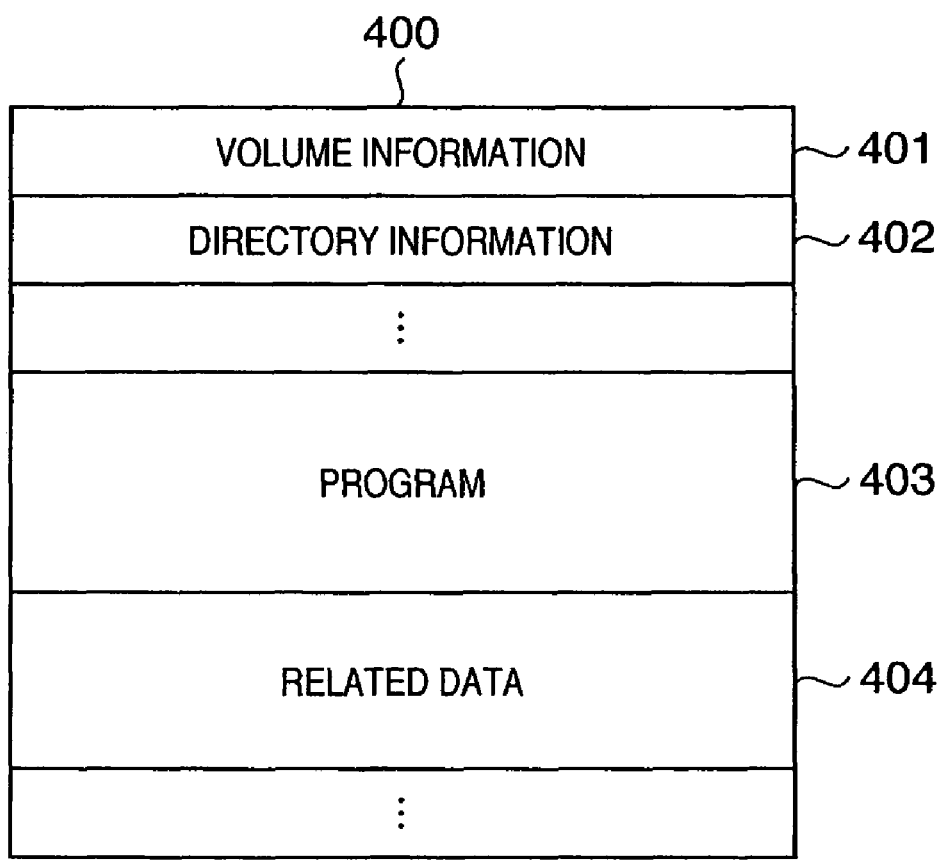
FIG. 4 is a view showing an example of the memory map of a storage medium according to the embodiment of the present invention.

FIG. 4 is a view showing an example of the memory map of the storage medium according to the embodiment of the present invention.

Referring to FIG. 4, reference numeral 400 denotes data contents of the storage medium 204; 401, volume information representing the information of the data; 402, directory information; 403, a program to implement the embodiment; and 404, related data of the program. The program 403 implements the flowchart shown in FIG. 7.

The processing sequence of the print system according to the embodiment will be described next with reference to FIG. 5.

Figure 5:
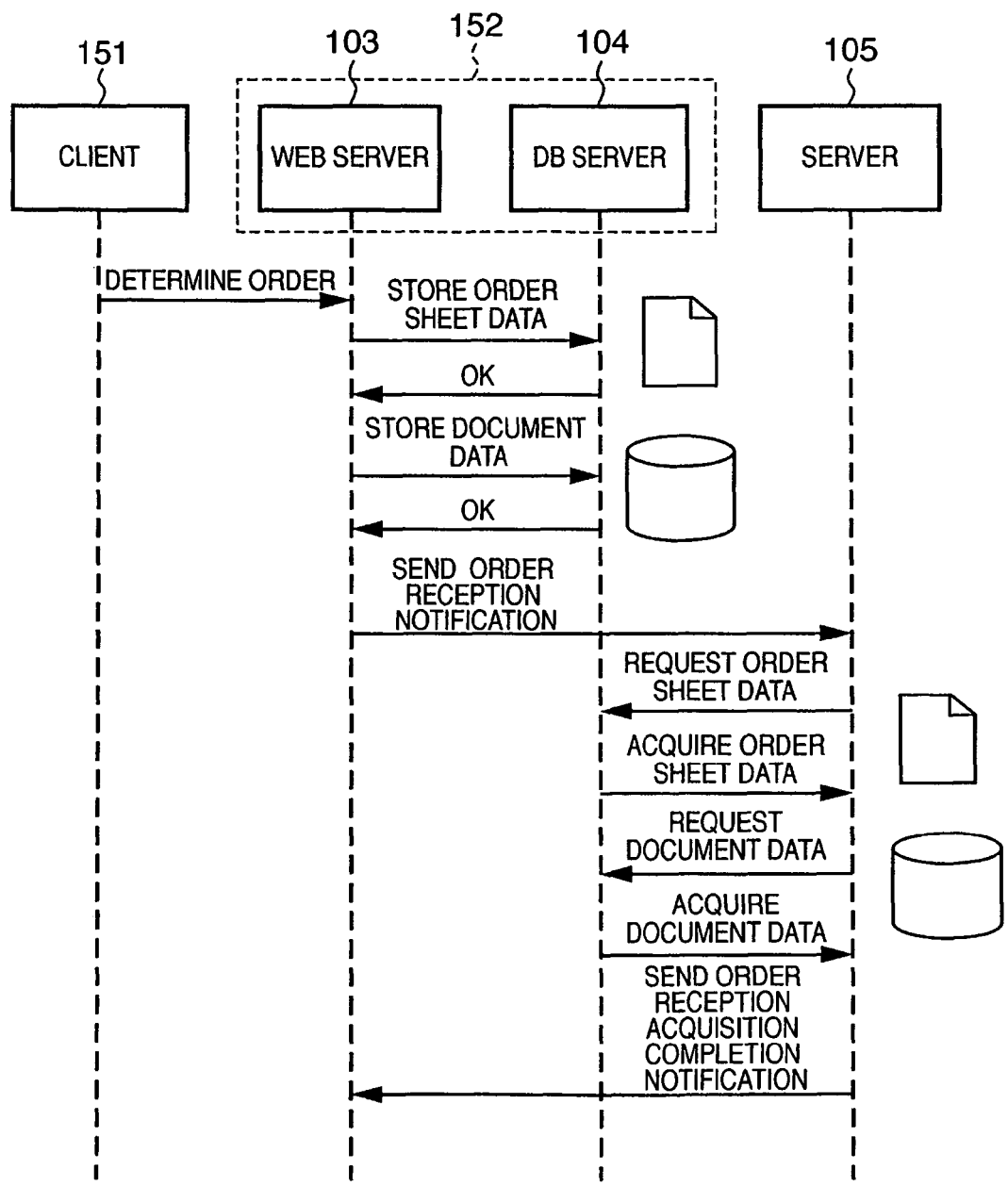
FIG. 5 is a chart showing the processing sequence of the print system according to the embodiment of the present invention.

FIG. 5 is a chart showing the processing sequence of the print system according to the embodiment of the present invention.

When order contents input from the client location 151 are determined, order sheet data is created by the WEB server 103 and stored in the DB server 104. Similarly, when document data is uploaded, it is stored in the DB server 104. When storage processing is ended, the WEB server 103 transmits an order reception notification (order reception information) to the server 105 in the print center 153.

Upon receiving the notification, the server 105 acquires the order sheet data from the DB server 104. If document data has been uploaded to the DB server 104, the server 105 acquires the document data from the DB server 104. When acquisition of the order sheet data and document data is ended, the server 105 transmits an order reception acquisition completion notification (order reception acquisition information) to the WEB server 103.

The server 105 stores, in, e.g., the RAM 202, the order sheet data and document data received from the DB server 104.

In the series of processing operations shown in FIG. 5, the server location 152 and print center 153 synchronize with each other. Simultaneously, order reception processing is executed in the server location 152, and print processing is executed in the print center 153. Hence, the processing load can be distributed in the entire system.

The functional arrangement of the server 105 in the print center 153 will be described next with reference to FIG. 6.

FIG. 6 is a view showing the functional arrangement of the server according to the embodiment of the present invention An order manager 601 is software that manages entered order information and generates the operation window shown in FIG. 7 (to be described later). The order manager 601 extracts print information (e.g., print style) from order sheet data collected from the WEB server 103 and DB server 104 and creates order information necessary for printing including the path name of document data (storage location of document data). FIGS. 14A to 14D show an example of contents stored in order information. The meanings of set values are described on the list, and a description thereof will be omitted here.

The operation window generated by the order manager 601 will be described next with reference to FIG. 7.

FIG. 7 is a view showing an example of the operation window of the order manager according to the embodiment of the present invention.

An operation window 700 is generated by an application that runs on the basis of, e.g., Microsoft Windows® OS. However, a WEB content based on HTML may also be used. In the present invention, an example of a Windows® application is used for the descriptive convenience.

The operation window 700 generated by the order manager 601 includes a list display window 701 to show the situation of an order in outline based on order information, and a tab display window 702 to show detailed information of the order. The operator can confirm the progress of the order while observing the operation window 700.

When the same order information is uploaded to the WEB server 103 as needed at the timing of status change, the same information can be provided, even to the user, on a processing situation content window (not shown) provided by the WEB server 103. The order information is held until completion of printing and delivery and then erased after delivery for security protection.

An order ID to identify an order, general information of the person in charge and the like, processing status, and scheduled date of delivery are displayed on the list display window 701. When a piece of order information is selected, details of the order information are displayed on the tab display window 702. The displayed contents also include the print style in FIG. 14D.

A work flow editor 607 shown in FIG. 6 will be described next with reference to FIG. 8.

Figure 8:
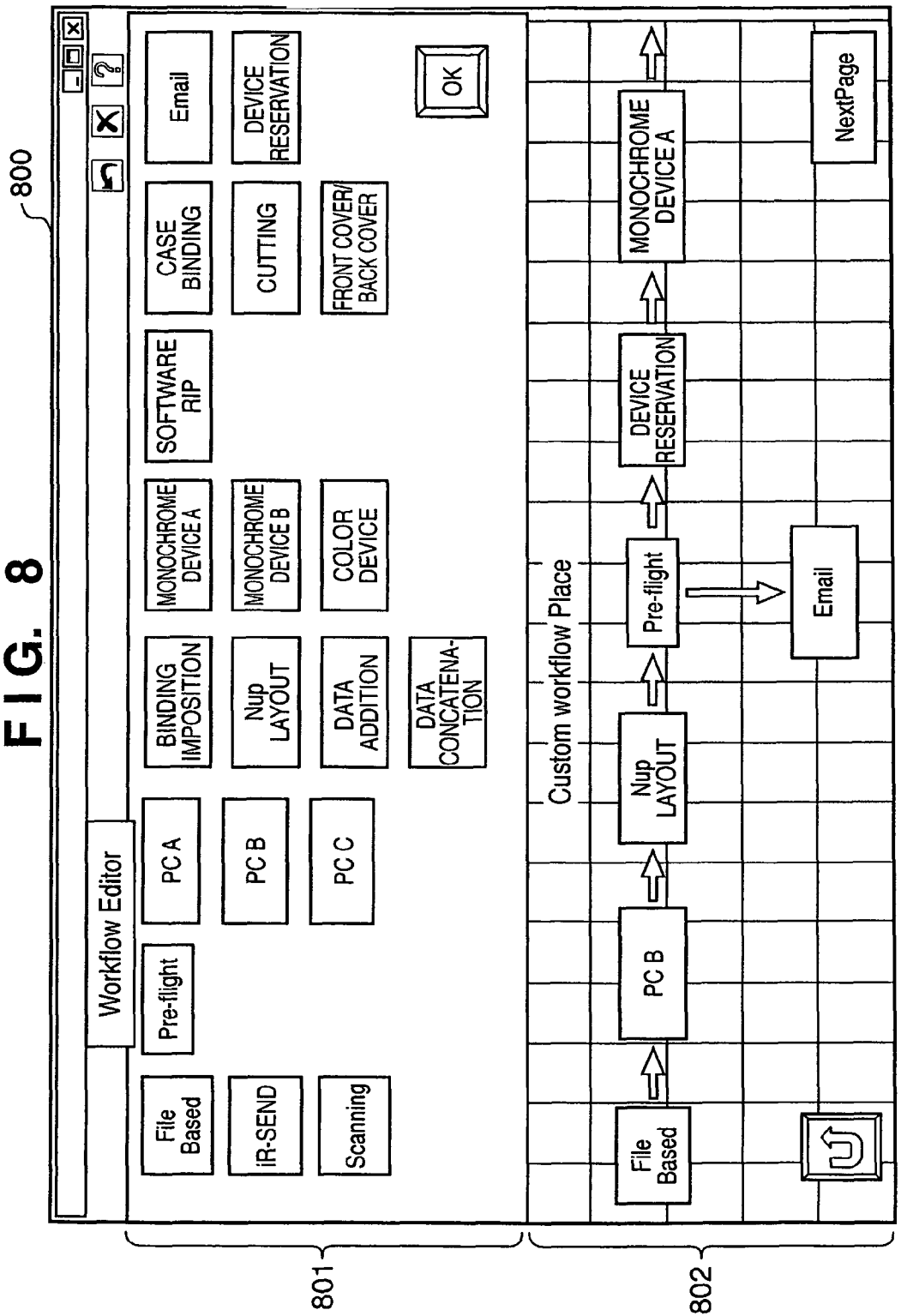
FIG. 8 is a view showing an example of a work flow editor according to the embodiment of the present invention.

FIG. 8 is a view showing an example of the work flow editor according to the embodiment of the present invention.

The work flow editor 607 creates a work flow for the operator in accordance with order information managed by the order manager 601. The work flow indicates the flow of processing of an order. Creating a work flow corresponds to creating work flow information to be processed by a work flow manager 602 as software to manage a work flow.

FIG. 8 shows an operation window 800 generated by the work flow editor 607. Icon components (blocks) arranged in an upper region 801 indicate steps and devices with functions in print processing. The icon components are displayed adaptively for each print center. When the blocks representing steps and devices are appropriately arranged and combined in a lower region 802 a work flow to implement the order can be generated.

The work flow manager 602 in FIG. 6 will be described next with reference to FIG. 9.

Figure 9:
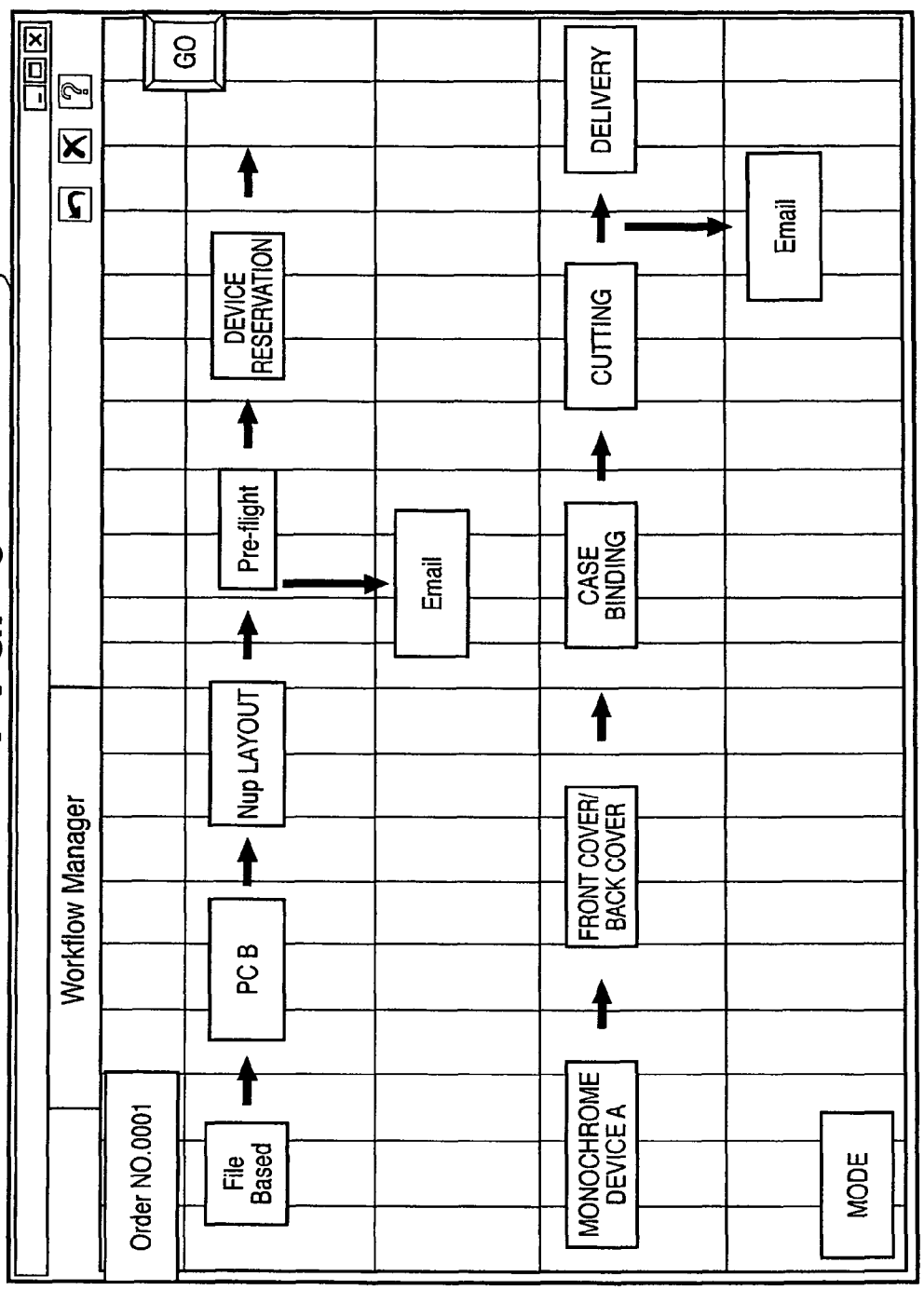
FIG. 9 is a view showing an example of a work flow manager according to the embodiment of the present invention.

FIG. 9 is a view showing an example of the work flow manager according to the embodiment of the present invention.

The work flow manager 602 loads the work flow created by the work flow editor 607 into itself and implement operation and progress management of the work flow for the operator. On the work flow manager 602, an operation window 900 to visualize the progress situation (status information) of the work flow is generated.

The operator executes an operation determined for each step on the basis of the status information. The status of a finished step is changed by the operator himself/herself. In, e.g., an online printing device, the status of the printing step is changed in accordance with a print end notification from a job manger 603.

A device scheduler 604 in FIG. 6 will be described next with reference to FIG. 10.

FIG. 10 is a view showing an example of the device scheduler according to the embodiment of the present invention.

When the status of the work flow manager 602 changes to "device reservation", the device scheduler 604 causes the operator to implement reservation of the print schedule of a printer adaptive to the order condition. To do this, the device scheduler 604 generates an operation window 1000 (schedule management window) to reserve the print schedule.

To execute a mass printing operation as scheduled, shared printers must be operated efficiently and systematically. Hence, the operator must avoid contention and ensure a planned operation by using the scheduling system. The operation window 1000 shown in FIG. 10 indicates an example of the scheduling system (device scheduler) capable of simultaneously displaying the print schedules of the respective printers.

The operator activates the device scheduler 604 from the work PC 106 and selects an arbitrary printer 1001 on the generated operation window 1000 by using an input device such as a keyboard or mouse. In a schedule display region 1003 including the time axis for the selected printer 1001, a use period 1002 (reserved region) is specified in the form of a rectangle (rectangular region) and reserved (registered).

The use period 1002 in FIG. 10 is expressed as a rectangular region. This is merely an example. Any other form can be used if the display form (e.g., a line segment or arrow representing the range of the use period or a character string representing a time) of the use period 1002 is easy to recognize.

In the above-described example, the form of a rectangle is specified by using an input device. However, the device scheduler 604 may automatically specify the form of a rectangle on the basis of the attribute of the received order. In this case, the device scheduler 604 executes schedule creation processing on the basis of information such as the number of pages, number of copies, color, and delivery date as the attribute of the received order and information such as the print speed and color print enable/disable state of the managed printing apparatus.

The job manger 603 in FIG. 6 will be described next with reference to FIG. 11.

Figure 11:
FIG. 11 is a view showing an example of a job manager according to the embodiment of the present invention.

FIG. 11 is a view showing an example of the job manager according to the embodiment of the present invention.

When the work flow manager 602 changes to the status of print processing, the operator activates a print component 616 from the work PC 106.

The print component 616 acquires registered print data and print information from the order information of the order manager 601 and downloads these data to the work PC 106 as print information. The operator selects the print data of the corresponding order and inputs a print instruction on the work PC 106. When printing starts in accordance with the print instruction, the job manger 603 communicates with the monochrome printer 111 or color printer 112 and monitors the print state of the print job.

As the monitor state, the job manger 603 generates an operation window 1101 to display the information (job list 1102) of the print job whose state changes successively. On the operation window 1101, an arbitrary print job can be controlled (to, e.g., stop printing).

The operator displays the operation window 1101 generated by the job manger 603 on the work PC 106. The operator can confirm, on the operation window 1101, e.g., the document name added to the print data, the status of the print job (e.g., output, standby for output, or stop), and the print job reception time.

The operator can also select an arbitrary print job and change its status by using the input device. The job manger 603 has a "redirect on error" printing function of causing a normal device to execute printing when a failure occurs in another device, a distributed printing function of distributing one print job to a plurality of devices (output devices (e.g., printers)), and a color/monochrome distributed printing function of determining color/monochrome and distributing a print job to color printers and monochrome printers.

The device manager 605 in FIG. 6 will be described next with reference to FIGS. 12 and 13.

Figure 12:
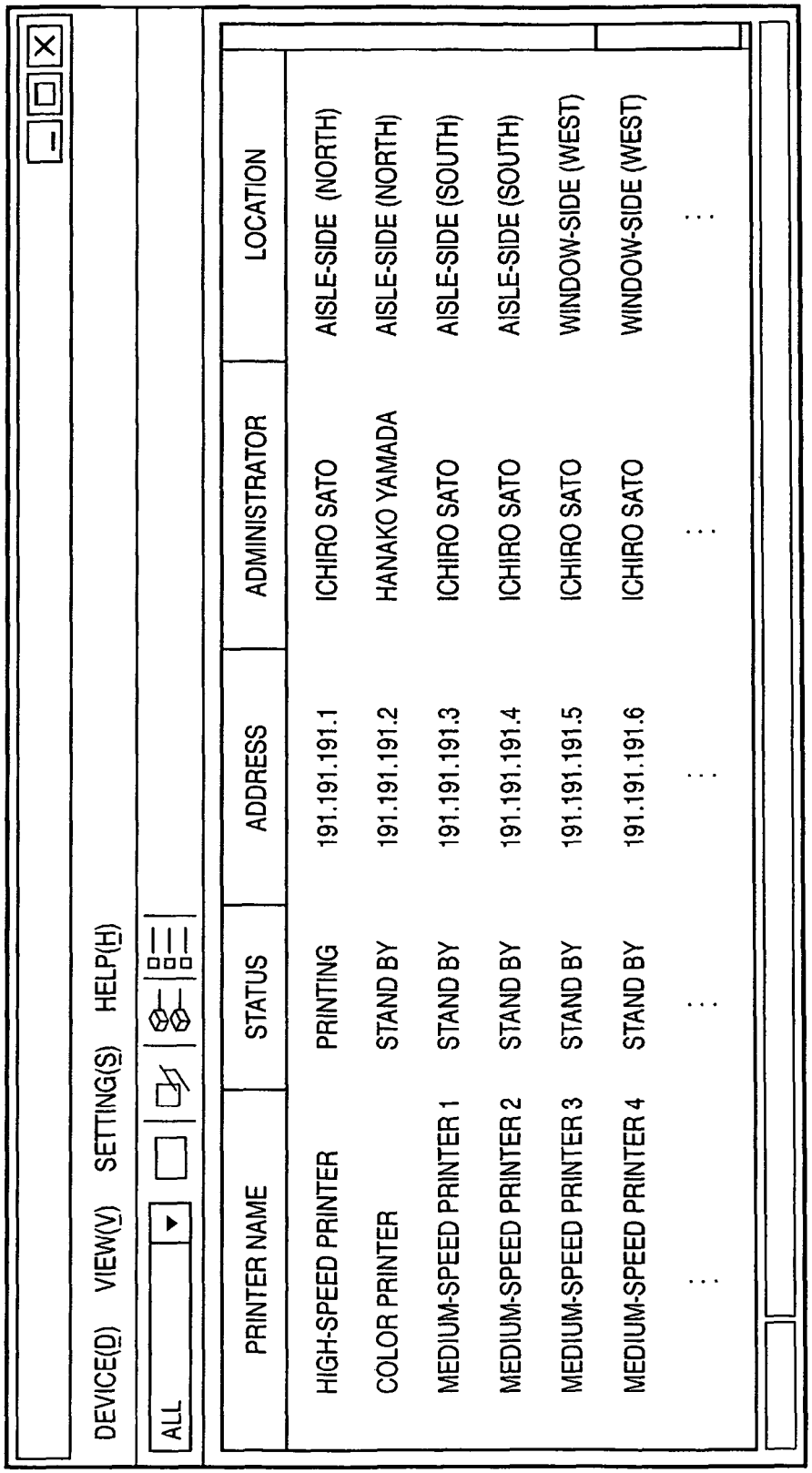
FIG. 12 is a view showing an example of a device manager according to the embodiment of the present invention.
Figure 13:
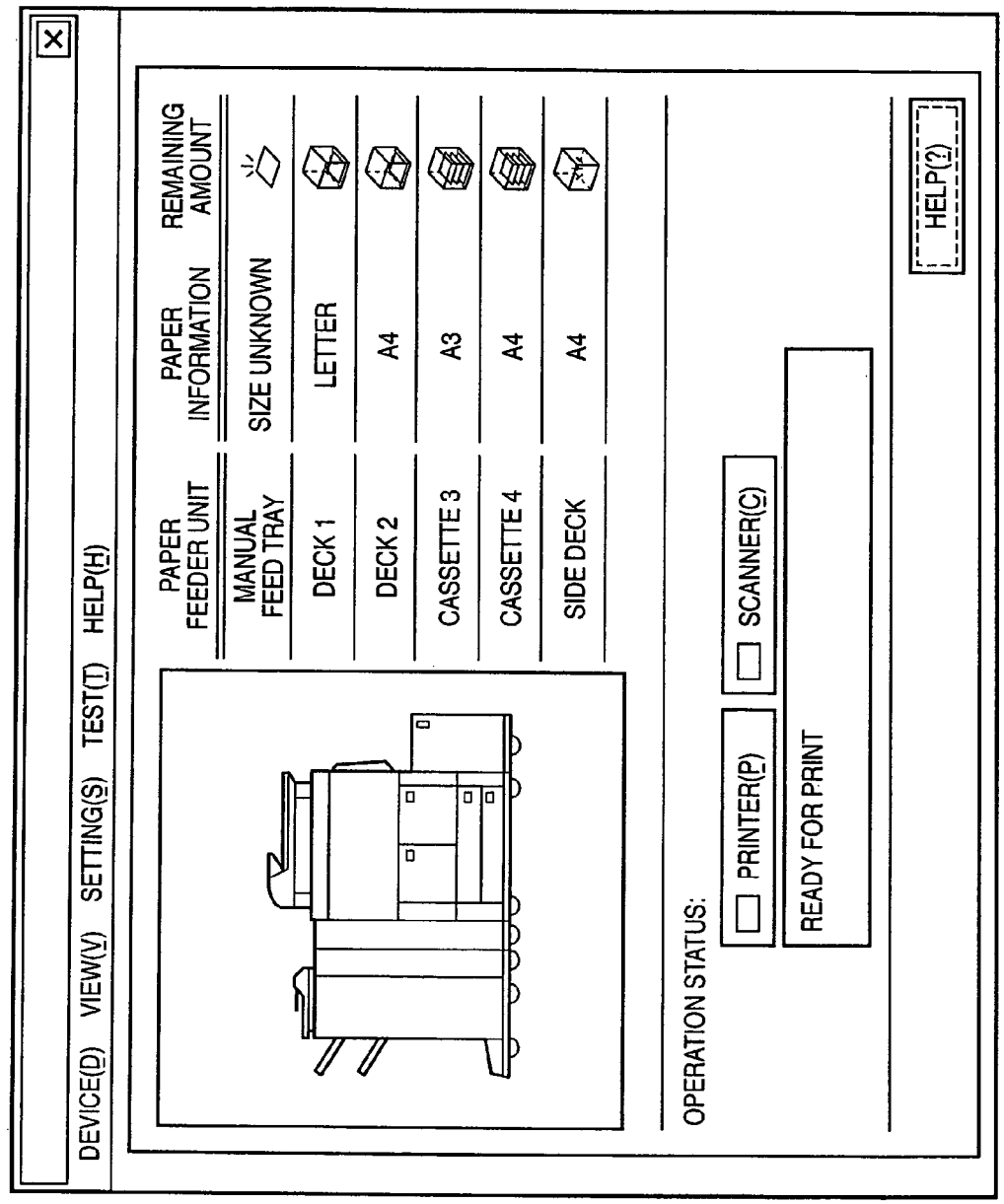
FIG. 13 is a view showing an example of the device manager according to the embodiment of the present invention.

FIGS. 12 and 13 are views showing an example of the device manager according to the embodiment of the present invention.

The device manager 605, i.e., software to manage devices to be used for various kinds of print processing manages the installation information (network address and administrator) of each device (printer). The device manager 605 periodically communicates with each printer and acquires and manages status (operation state and error/warning occurrence state) information. FIG. 12 shows a display window to display a list of installation information of printers generated by the device manager 605.

The device manager 605 also periodically communicates with each printer, acquires device information of the printer from a device information table 606, and manages the information. FIG. 13 shows a display window to display, of the device information generated by the device manager 605, expendables information (paper) of an arbitrary printer.

In the device information managed on the device information table 606, capability information (processing speed per unit time and a finishing function such as binding, staple, and punch) and expendables information (e.g., printing paper sheets, toners, and staples) are managed. The device information also includes a print type (color/monochrome), installation location, address information (IP address), processing capability (output (print) speed), outputtable paper sizes (e.g., A3 at maximum), outputtable paper types (e.g., 0.5 mm thick at maximum), paper feed stages (paper cassettes), paper feed stage switching time, number of paper feed stages, and types of paper sheets set in the paper feed stages and their order.

The device information table 606 may be managed in the DB server 104.

The device manager 605 has a function of sending device information as needed in accordance with a request from the order manager 601, work flow manager 602, and job manger 603.

The work flow manager 602 returns the status in accordance with a status acquisition request from the order manager 601. Hence, the order manager 601 can display, on the order manager 601, the status corresponding to the status acquisition request.

To explain the characteristic feature of the present invention, document output in a prior art will be described again with reference to FIG. 15.

FIG. 15 is a view for explaining document output according to a prior art.

Reference numerals 1501 to 1506 denote pages 1 to 6, respectively, of a document to be output. In this document, paper type A is designated for the page 1501, paper type B for the page 1502, paper type C for the page 1503, paper type D for the page 1504, paper type E for the page 1505, and paper type A for the page 1506.

Each of reference numerals 1507 and 1508 denotes a copy of printed product (a copy of printed product including a page 1511 (paper type A), page 1512 (paper type B), page 1513 (paper type C), page 1514 (paper type D), page 1515 (paper type E), and page 1516 (paper type A)) output from an output device 1509. Reference numeral 1510 denotes an interchangeable paper cassette 1510 in which paper sheets of type E are set. The output device 1509 has four stages of paper cassettes in which paper sheets of types A, B, C, and D are set.

As shown in FIG. 15, this document uses five paper types, i.e., paper types A to E. However, only four paper cassettes can be set in the output device 1509. More specifically, when the output device 1509 is to output a plurality of copies of document using five paper types shown in FIG. 15, a paper exchange error occurs to set the paper cassette 1510 of the paper type E halfway through the output every time the paper types A to D are output.

Every time the paper exchange error occurs, the operator must exchange the interchangeable paper cassette 1510 with one of the paper cassettes of paper types A to D set in the output device 1509. Hence, the productivity is very poor.

Document output according to the embodiment of the present invention will be described with reference to FIG. 16.

Figure 16:
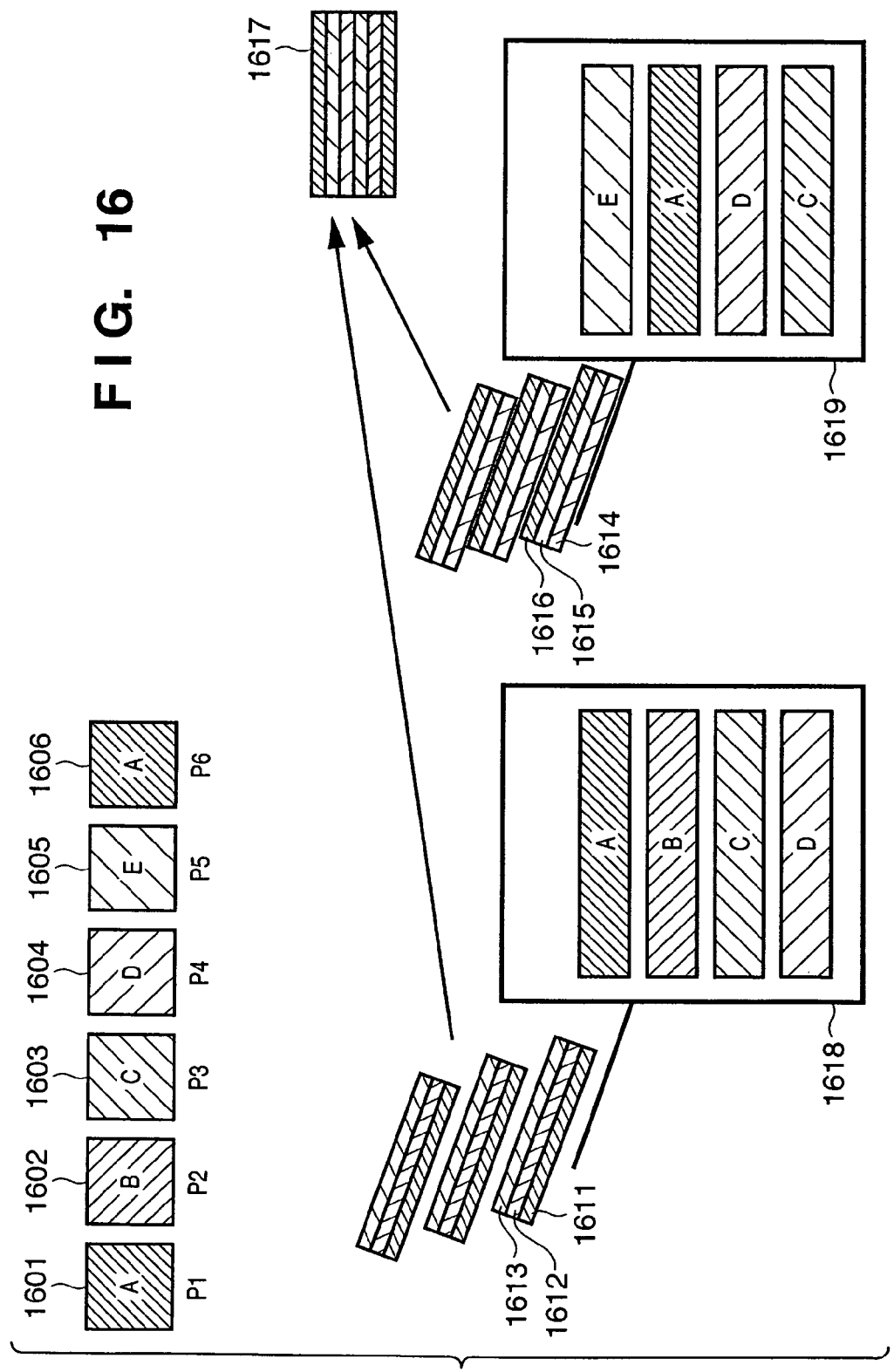
FIG. 16 is a view for explaining document output according to the embodiment of the present invention.

FIG. 16 is a view for explaining document output according to the embodiment of the present invention.

Reference numerals 1601 to 1606 denote pages 1 to 6 (1601 to 1606), respectively, of print data (document data) to be output. In this print data, the paper type A is designated for the page 1601, paper type B for the page 1602, paper type C for the page 1603, paper type D for the page 1604, paper type E for the page 1605, and paper type A for the page 1606. This arrangement is the same as the document shown in FIG. 15.

An output device 1618 has paper cassettes in which sheets of types A to D are set. An output device 1619 has paper cassettes in which paper sheets of types A and C to E are set. The output devices 1618 and 1619 are connected to, e.g., the LAN 123 in the print center 153 together with other output devices.

The server 105 selects an output device as the data output destination of print data by print control processing shown in FIGS. 17A and 17B (to be described later) on the basis of the print data to be output. Especially the server 105 of this embodiment selects an output device which requires no paper cassette exchange on the basis of paper types necessary for the received print data in printing the print data.

With the print control processing shown in FIGS. 17A and 17B (to be described later), the server 105 decides an output method that requires no paper exchange in printing the print data to be output. For example, when divisional output is executed by combining the output devices 1618 and 1619 on the LAN 123, the server 105 can execute print processing without exchanging paper.

In this example, pages 1 to 6 of print data to be output are divided into pages 1 to 3 and pages 4 to 6. The divided pages are divisionally output to the output devices 1618 and 1619.

That is, the information processing apparatus divides the print data in accordance with the page order.

Referring to FIG. 16, printed products 1611, 1612, and 1613 output from the output device 1618 correspond to page 1 (1601), page 2 (1602), and page 3 (1603). Printed products 1614, 1615, and 1616 output from the output device 1619 correspond to page 4 (1604), page 5 (1605), and page 6 (1606). In this way, the server 105 divisionally outputs the print data to the printing apparatuses included in the combination of selected printing apparatuses without changing the page order of the print data. As a result, the user can obtain an output result of the print data with the pages arranged in order by only, e.g., stacking printing results output from the printing apparatuses.

Hence, in this embodiment, in printing print data, a printed product based on the print data can be output without exchanging paper cassettes in the output device as the output destination.

The operator can complete a printed product 1617 corresponding to the received order by merging the printed products output from the output devices 1618 and 1619.

Print control processing which is executed by the server 105 of this embodiment to select a combination of printing apparatuses among a plurality of printing apparatuses as the print destination of print data to be processed will be described next with reference to FIGS. 17A and 17B.

Figure 17A:
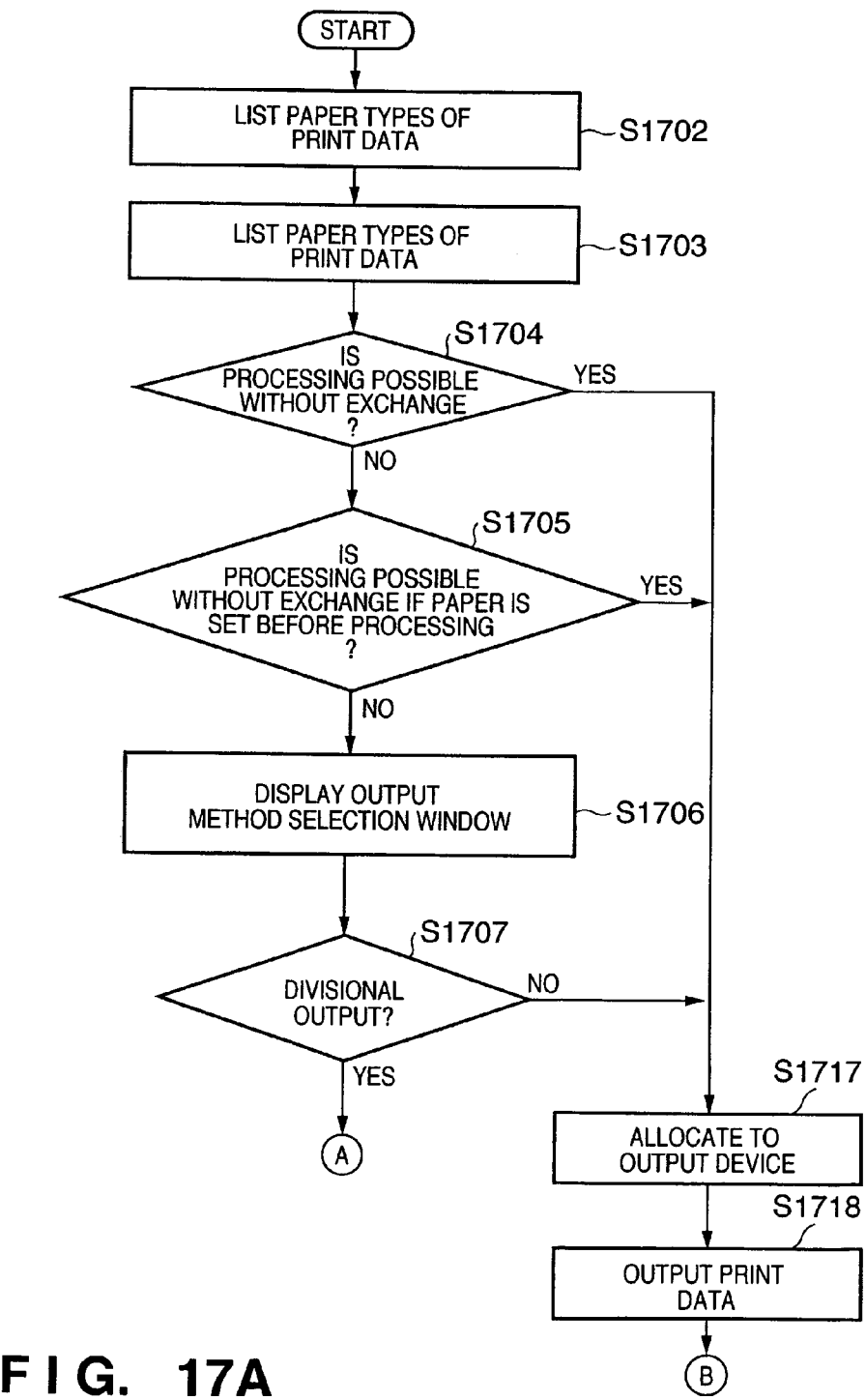
FIGS. 17A and 17B are flowcharts showing print control processing executed by a server according to the embodiment of the present invention.
Figure 17B:
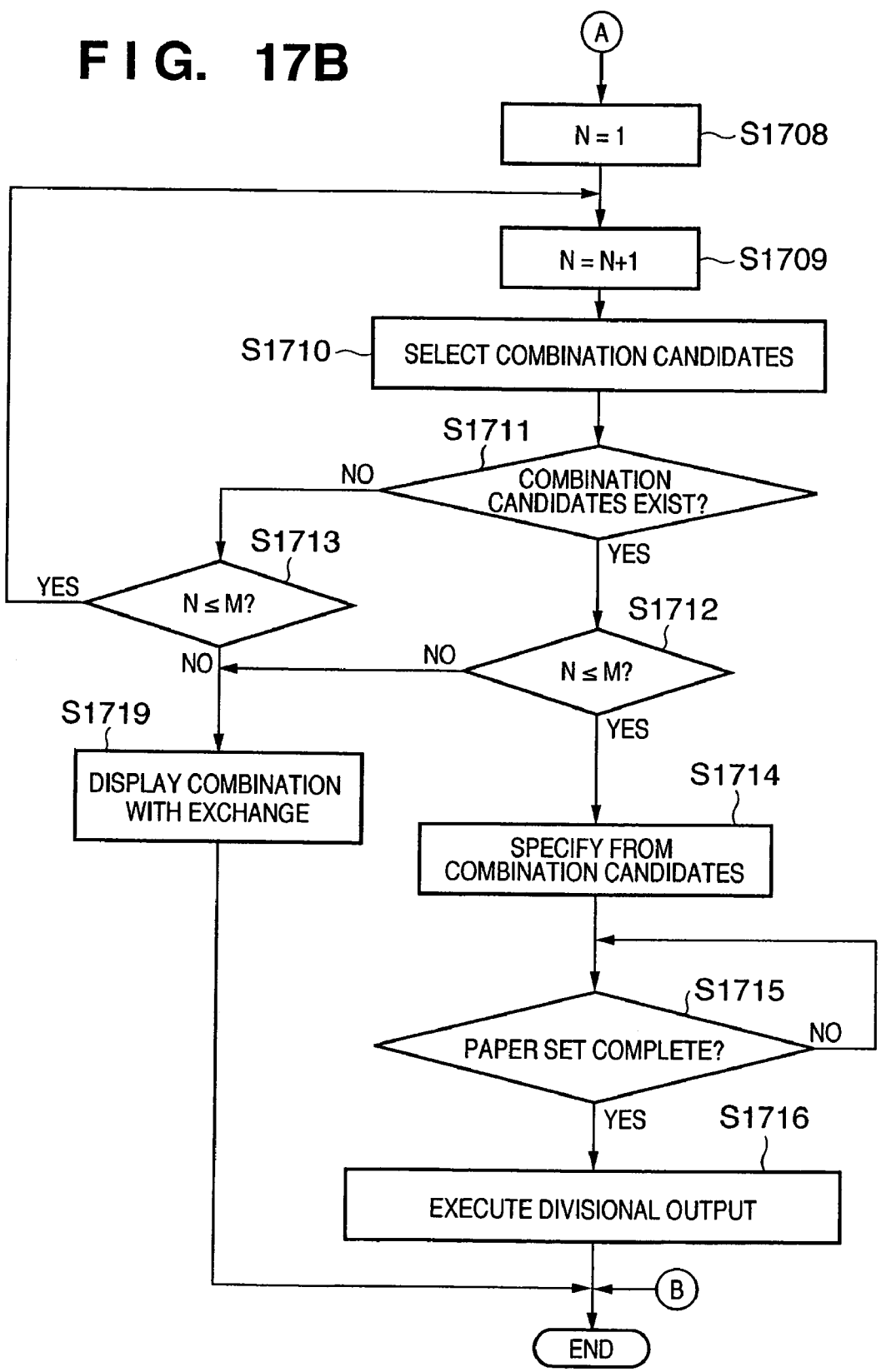

FIGS. 17A and 17B are flowcharts showing print control processing executed by the server according to the embodiment of the present invention FIGS. 17A and 17B show processing of specifying an output method of outputting a print job designated on the basis of order information and, more particularly, processing of selectively allocating an output device (printer) to execute print processing without paper cassette exchange as described above.

Various kinds of operation windows (FIGS. 18 to 21) displayed on the display of the server 105 by the processing shown in FIGS. 17A and 17B are generated by, e.g., the device scheduler 604 in the server 105. The steps of the flowchart shown in FIGS. 17A and 17B are executed by processing of the CPU 200 in the server 105.

When a print job is determined, and print data (document data) to be output is decided, the server 105 shifts control to the processing shown in the flowchart of FIGS. 17A and 17B.

First, in step S1702, the server 105 (to be referred to as a print server here) lists paper (medium) types to be used for printing defined by the print data.

More specifically, the contents of paper types to be used for print processing are described in order sheet data received from the DB server 104. The order sheet data received from the DB server 104 is held in the RAM 202 of the print server 105. When the order manager 601 refers to the RAM 202, necessary paper types can be grasped, and the grasped paper type information can be listed. The list of paper type information is held in the RAM 202 of the print server 105.

In step S1703, the print server 105 looks up the device information table 606 to search for output devices (printers) to which the print job can be allocated. Types of paper sheets set in the paper feed stages of each detected output device are listed.

More specifically, the device manager 605 can acquire the state and function (e.g., the type of paper sheets set in the paper feed stage) of each output device (printer) by communicating with the output device (printer). The device manager 605 can acquire not only information of paper cassettes currently set in each output device but also information of settable paper cassettes (paper types).

On the basis of the information acquired by the device manager 605, the storage control unit provided in the print server 105 lists device information about the paper feed stages of each printing apparatus and stores the list in the RAM 202. Processing in step S1703 can be executed in this way.

FIG. 23 shows an example of list information (list rows 2301 to 2304) of paper types set in the paper feed stages of each output device. The list row 2301 shown in FIG. 23 indicates, e.g., that the paper type A is set in paper cassette 1 and the paper type B is set in paper cassette 2 currently in output device 1. The list shown in FIG. 23 indicates that the paper types E, F, and G can be set in output device 1.

In step S1704, the print server 105 recognizes one of M output devices that are present on the list selected by the user. It is determined whether the recognized output device can print the print data to be printed without paper exchange halfway throughout printing.

More specifically, the processing is implemented by causing the work flow manager 602 to determine whether all paper types necessary for the print data to be printed are set in the selected output device.

For example, assume that it is determined on the basis of the paper type information listed in step S1702 that the two paper types A and B are necessary for print data to be processed. In addition, assume that output device 1 is selected from the paper type information listed in step S1703.

In this case, the work flow manager 602 determines that the paper types set in the paper cassettes of selected output device 1 include both the paper types A and B necessary for the print data to be processed. Hence, the work flow manager 602 determines that processing can be executed without paper exchange.

As an example wherein paper exchange occurs, assume that print data that requires the two paper types A and B is to be processed by output device 2. The work flow manager 602 can recognize from the list shown in FIG. 23 that the paper types D and C are set in output device 2. Hence, the work flow manager 602 determines that the paper types A and B necessary for the print data to be processed are not set in output device 2 and consequently determines that processing without exchange is impossible (NO in step S1704).

If it is determined in step S1704 that printing can be done by one output device (YES in step S1704), the print server 105 allocates the print data to be processed to the selected output device (step S1717). In step S1718, the print server 105 allocates all pages of the print data to the selected single output device to output the print data.

If it is determined in step S1704 that printing cannot be done by one output device (NO in step S1704), the flow advances to step S1705. In step S1705, the print server 105 determines whether printing without paper exchange halfway through printing can be executed by setting paper sheets of necessary types (or paper feed stages in which paper sheets of necessary types are set) in the paper feed stages of the output device recognized in step S1704 before print processing.

The device manager 605 can acquire paper cassette information settable in each device, as described above. Hence, step S1705 is implemented by causing the work flow manager 602 to determine whether all paper types necessary for the print data can be processed by the selected output device.

For example, assume that the three paper types B, C, and G are necessary for the print data to be processed, and output device 4 is selected. In this case, the work flow manager 602 can determine on the basis of the list shown in FIG. 23 that the six paper types B, C, D, E, G, and H can be set in output device 4. Hence, the work flow manager 602 determines that processing can be executed without cassette exchange for the paper types B, C, and G during print processing when the paper cassettes of output device 4 are changed in advance (the currently set paper types C, D, and E are changed to the paper types B, C, and G).

If the print server 105 determines in step S1705 that processing can be executed (YES in step S1705), the flow advances to step S1717 to allocate the selected single device as the output device.

The print server 105 outputs, to the selected output device, a confirmation window including information representing that printing without paper exchange can be done by setting paper sheets of necessary types in the paper feed stages of the output device and information to promote to set paper sheets of necessary types in the paper feed stages.

After recognizing that the paper exchange completion instruction of the output device is input by the operator on the confirmation window, the print server 105 allocates all pages of the print data to the selected single output device to output the print data in step S1718.

If the print server 105 determines in step S1705 that printing by one output device is impossible (NO in step S1705), the flow advances to step S1706. In step S1706, the print server 105 displays an output method selection window (FIG. 18) to select an output method of dividing the print data to be processed and divisionally outputting (distributed-printing) the print data to execute output without paper exchange from the output device of the output destination or a method of outputting the print data while exchanging paper sheets in the desired single output device.

An example of the output method selection window will be described with reference to FIG. 18.

Figure 18:
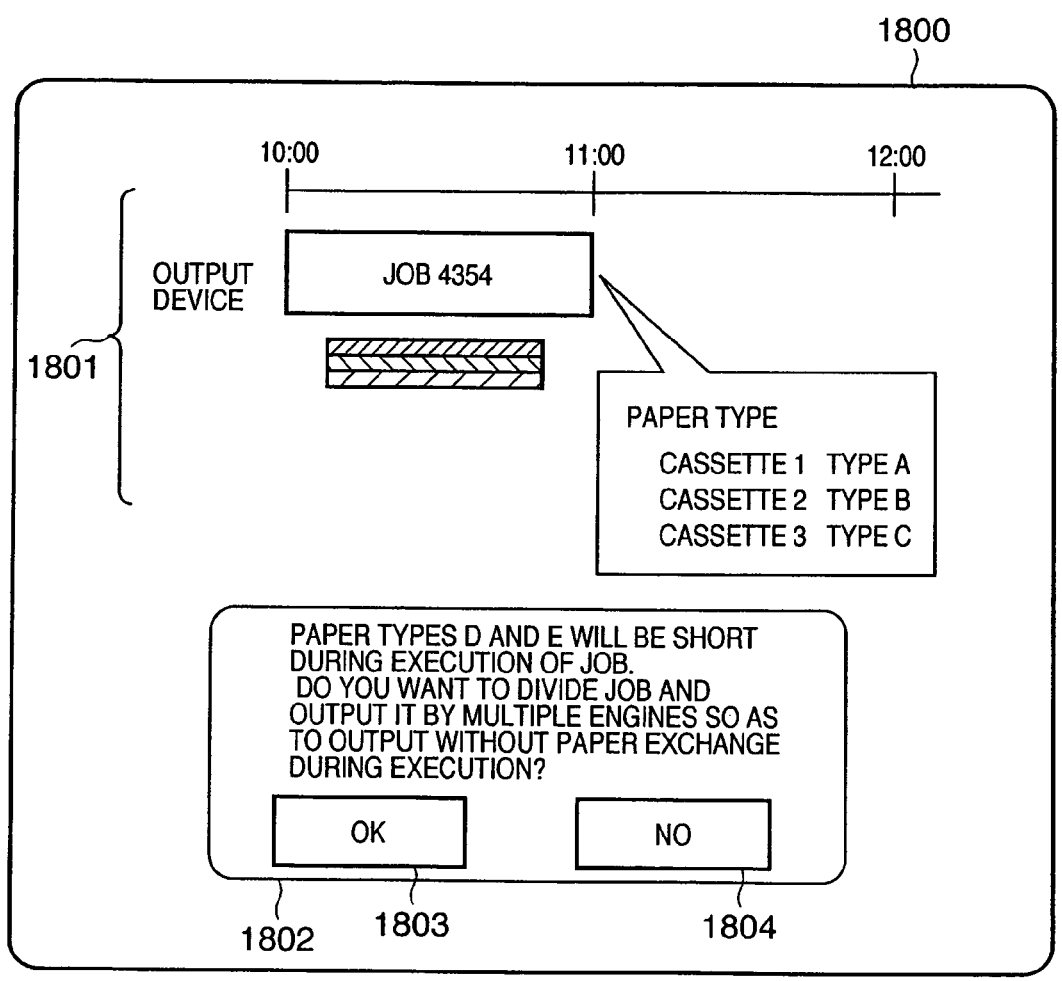
FIG. 18 is a view showing an example of an output method selection window according to the embodiment of the present invention.

FIG. 18 is a view showing an example of the output method selection window according to the embodiment of the present invention.

An output method selection window 1800 shown in FIG. 18 is a window to receive confirmation and change of the output method of print data to be processed. Especially, the output method selection window 1800 functions as a confirmation window to make the operator confirm whether to avoid paper exchange during printing by dividing print data and allocating the data to different output devices.

The output method selection window 1800 includes a schedule information display region 1801 to display information about the print schedule in an output device as an output destination candidate, a message display region 1802, an OK button 1803, and a NO button 1804.

In the print schedule information display region 1801, a time axis representing a print schedule when outputting print data (print job) by a designated output device and information representing paper types currently set in the paper feed stages (paper cassettes) of the output device are displayed. These pieces of information become displayable when the work flow manager 602 recognizes, from the RAM 202, the information formed into lists in steps S1702 and S1703.

In the message display region 1802, a message to make the operator confirm whether to avoid paper exchange during printing by dividing print data and allocating the data to different output devices is displayed.

To divisionally output print data to be processed, the operator can determine the divisional output by operating the OK button 1803 on the message. Not to divisionally output print data to be processed, the operator can determine, by operating the NO button 1804, to output print data to be processed while exchanging paper sheets in the single output device.

The output device to be used for divisional output can automatically selected by the print server 105. Alternatively, an output device selection window to select the output device to be used for divisional output may be displayed to cause the operator to select the output device.

FIGS. 17A and 17B will be described again.

In step S1707, the print server 105 determines on the basis of the operation input in the output method selection window 1800 whether to divisionally output the print data to be processed. If the print server 105 recognizes click on the NO button 1804 and determines not to do divisional output (NO in step S1707), the flow advances to step S1717 to allocate the selected single device as the output device. In this case, processing is executed while exchanging the paper cassette during print processing, as described above. In step S1718, the print server 105 allocates all pages of the print data to the selected single output device to output the print data.

If the print server 105 recognizes click on the OK button 1803 and determines to do divisional output in step S1707 (YES in step S1707), the flow advances to step S1708.

With processing in steps S1708 to S1711, the print server 105 selects N output devices (N=1 to M) as divisional output destination candidates from M output devices to which the print data to be processed can be output. The print server 105 selects a combination of a plurality of output devices capable of executing print processing without paper exchange.

Especially in this selection, all combinations of output devices capable of divisionally outputting print data without paper exchange during printing (or capable of omitting paper exchange during actual printing by exchanging paper sheets in advance) are listed.

The object of the present invention is to process print data such that paper exchange does not substantially occur during print processing.

In simply selecting a combination of output devices, a plurality of output device combination candidates may occur. In this case, a window (FIG. 25) to specify a combination of desired output devices from the output device combination candidates is presented. The final combination of output devices is specified by receiving a selection operation from the operator.

As an example of the specifying method, a use priority of each output device may be added to each device information. An output device combination candidate that maximizes the priority defined by the combination candidates of output devices may be selected as the final combination of output devices.

Processing from step S1708 will be described below in detail.

In step S1708, the print server 105 sets N to 1 (N=1), which defines the number of output devices as divisional output destination candidates to be combined. In step S1709, N is incremented by one. In step S1710, the print server 105 selects the combination candidates of output device to be used for divisional output in the number N of devices to be combined.

More specifically, the paper types necessary for the print data to be processed are already grasped in step S1702. The paper cassettes set in output devices capable of output are already grasped in step S1703. By comparing these pieces of information, combination of printing apparatuses including the plurality of paper types necessary for the print data are selected on the basis of the information of paper types set in the paper feed stages of each printing apparatus.

A detailed example will be described. Assume that the four paper types A to D are necessary. In this case, the work flow manager 602 selects combination capable of processing the paper types A to E from the list shown in FIG. 23. In the example shown in FIG. 23, the work flow manager 602 selects a combination of output device 1 (paper types A and B are already set) and output device 2 (paper types C and D are already set).

The work flow manager 602 also selects a combination of output devices 1 and 4. The work flow manager 602 also selects a combination of output devices 1 and 3 in consideration of the paper types (B, C, D, E, G, and H) settable in the output device 3.

FIG. 22 shows a combination list of output devices selected by the work flow manager 602 in step S1710. In FIG. 22, the keyboard 206 selects three combinations 2201 to 2203.

In combination 3, "preset item" describes "output device 3, H or E→D". This indicates that output device 3 in combination 3 requires preset before the start of print processing as described above. That is, in combination 3, the paper type H or E must be changed to D in advance.

In the above-described way, the work flow manager 602 selects combination of printing apparatuses to process print data on the basis of device information stored in the RAM 202 and paper type information necessary for the print data to be processed. If paper exchange is necessary before print processing, the work flow manager 602 transmits exchange request information to request paper type exchange to the printing apparatus which should exchange the paper type.

In step S1711, the print server 105 determines whether combination candidates are found.

More specifically, if combination candidates are found in step S1710, the work flow manager 602 holds the list shown in FIG. 22 in the RAM 202. Hence, the determination processing in step S1711 is possible. If it is determined in step S1711 that no combination candidate is found (NO in step S1711), the print server 105 determines whether N≦M in step S1713. If it is determined that N≦M (YES in step S1713), the flow returns to step S1709.

If the print server 105 determines in step S1711 that combination candidates are found (YES in step S1711), it is determined whether the number N of devices to be combined is equal to or smaller than M (step S1712). If it is determined that N≦M (YES in step S1712), the flow returns to step S1714.

If it is determined that N≦M in step S1712 or S1713, a combination capable of minimizing the number of times of paper type exchange is selected and displayed (step S1719).

That is, if no printing apparatus combination including the plurality of paper types necessary for print data can be selected, the work flow manager 602 selects a combination capable of minimizing the number of times of paper exchange. The processing in step S1719 will be described later in detail.

If it is determined in step S1712 that N≦M (YES in step S1712), the print server 105 specifies a combination to execute divisional processing from the combination candidates selected in step S1710 (S1714). The method of selecting a combination to execute divisional processing from the combination candidates will be described later. The combination to execute divisional output which is specified in step S1714 is held in the RAM 202.

Figure 19:
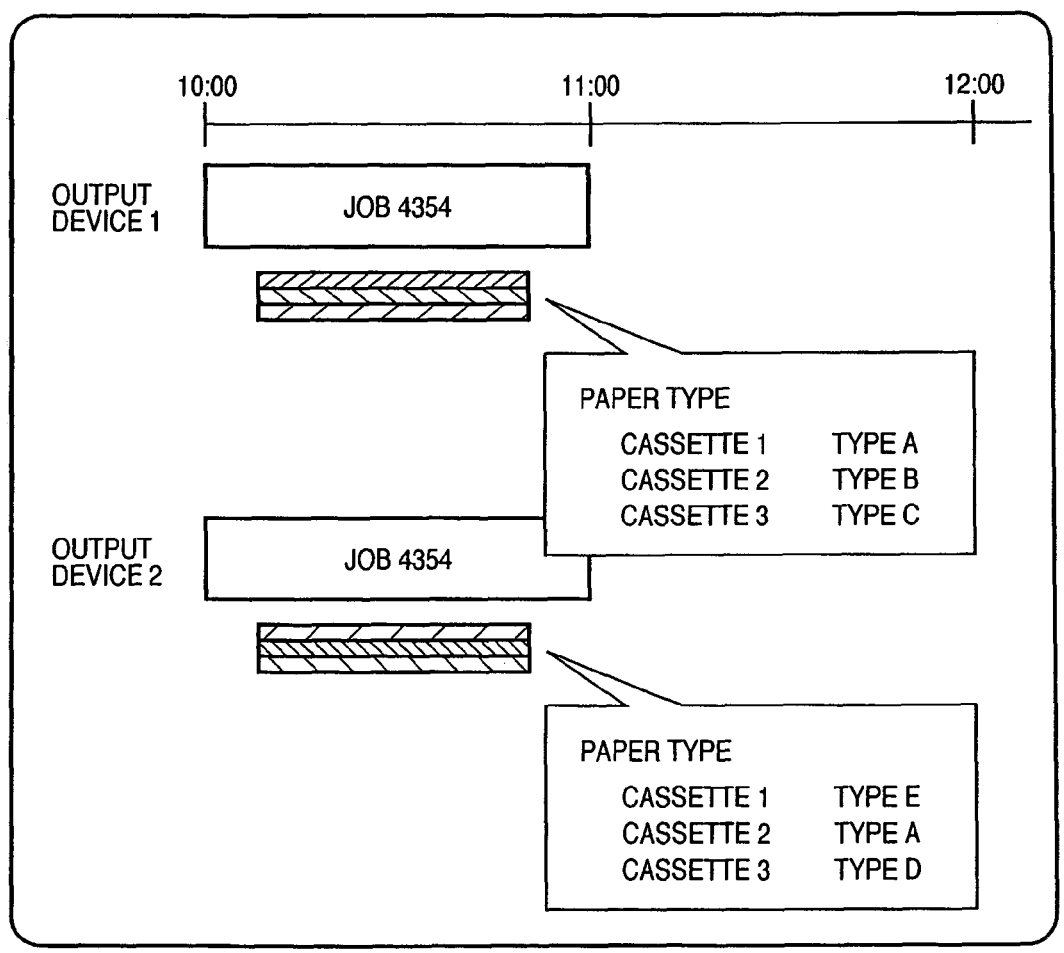
FIG. 19 is a view showing an example of an output device selection result window according to the embodiment of the present invention.

When the combination to execute divisional output is specified, the print server 105 displays the selection result as, e.g., an output device selection result window (FIG. 19). The output device selection result window includes information representing the output devices as the divisional output destinations and paper types to be set in their paper feed stages.

Hence, the operator can confirm the output devices as the divisional output destinations and paper types to be set in their paper feed stages. The operator can set paper sheets of necessary types in the paper feed stages in advance before execution of print processing, as needed.

In step S1715, the print server 105 determines whether paper sheets necessary for print processing are set in the N specified output devices to execute divisional output.

More specifically, the work flow manager 602 outputs paper setting information (paper type and sheet count information) necessary for the print data to be processed to each output device to execute divisional output.

Figure 20:
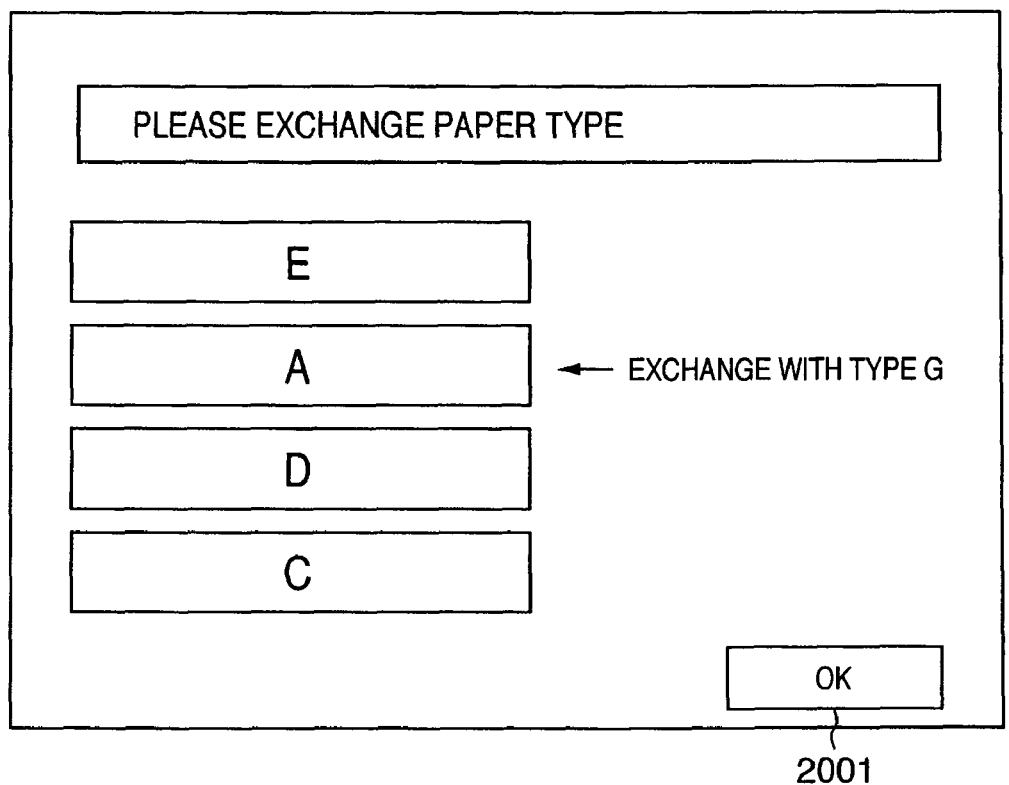
FIG. 20 is a view showing an example of an exchange request notification window according to the embodiment of the present invention.

Each output device to execute divisional output displays the window shown in FIG. 20 on the basis of the paper setting information transmitted in step S1715. On the basis of the information displayed in FIG. 20, paper sheets of types necessary for print processing are set. When an OK button 2001 in FIG. 20 is clicked on, a paper setting end notification is transmitted to the print server 105. Then, the print server 105 determines in step S1715 that paper setting is ended.

In step S1716, the print server 105 executes divisional output (distributed printing) of print data for the output devices specified in step S1714 to execute divisional output.

More specifically, the work flow manager 602 allocates the print data to each of the printing apparatuses of the combination such that print processing can be executed by the selected combination of printing apparatuses, thereby executing print processing.

In this embodiment, paper exchange indicates both exchanging a paper feed stage in which paper sheets of necessary type are set and exchanging paper sheets currently set in a paper feed stage with paper sheets of necessary type.

In this embodiment, the paper type indicates a type that allows the operator to identify the difference in paper attribute or form such as the quality (e.g., plain paper, glossy paper, and cardboard), size (e.g., A3, A4, and B5), and brand (e.g., plain paper available from maker A and plain paper available from maker B) of paper sheets.

In the above-described example, the print control shown in FIGS. 17A and 17B is executed on the print server 105. However, the print control may be executed on the output device operated by the operator. In this case, the print control shown in FIGS. 17A and 17B is implemented by causing the output device to exchange device information between other output devices connected to the network in accordance with the operator's operation.

When divisional output shown in FIGS. 17A and 17B is to be executed, the print server 105 may present a window to select the division method (division mode) so that divisional output by dividing print data or divisional output for each copy can be selected.

When the print control shown in FIGS. 17A and 17B is executed, a combination of printing apparatuses capable of reducing the number of times of paper type exchange can be selected, and the load on the operator in exchanging the paper type can be reduced.

When the above-described control method is used, efficient print processing can be provided even in a work flow system with a preset schedule.

A method of specifying a combination to execute divisional processing from a plurality of combination candidates in step S1714 when they are selected in step S1711 in FIG. 17B will be described below with reference to FIGS. 25 to 27.

Figure 25:
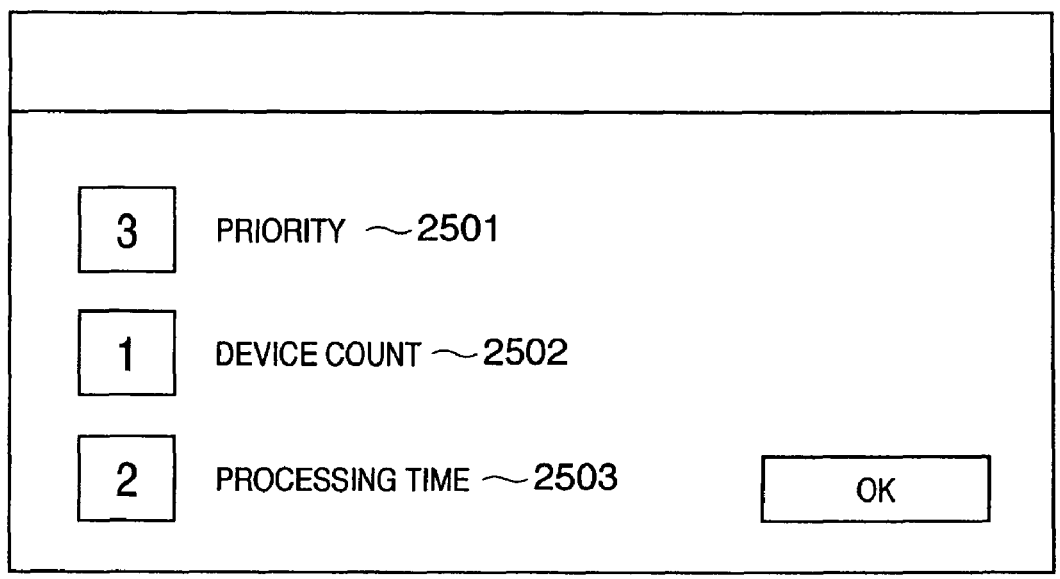
FIG. 25 is a view showing an example of a UI to specify a combination of printing apparatuses according to the embodiment of the present invention.

When a plurality of combination candidates are selected in step S1711, the print server 105 displays the window shown in FIG. 25.

FIG. 25 is a view showing a UI to decide the criterion for the specifying processing in step S1714. FIG. 25 shows, as items, "priority" 2501, "device count" 2502, and "processing time" 2503. The order of selection criteria is input to the setting box provided for each item in FIG. 25. In FIG. 25, for example, setting is done to execute specifying processing in an order of "device count", "processing time", and "priority". The information set in FIG. 25 is held in the RAM 202.

The flowchart in FIG. 26 will be described next.

The print server 105 initializes a selection criterion order m (m=1) (step S2601). The print server 105 starts specifying processing using an item corresponding to the selection criterion order m (step S2602).

To specify on the basis of the priority, the work flow manager 602 specifies, from the selected combinations of printing apparatuses, a combination of printing apparatuses for which the sum of priorities set for them is maximum.

To specify on the basis of the device count, the work flow manager 602 specifies, from the selected combinations of printing apparatuses, a combination including a minimum number of printing apparatuses.

To specify on the basis of the processing time, the work flow manager 602 specifies, from the selected combinations of printing apparatuses, a combination of printing apparatuses for which the print time is shortest.

The selection criterion order information is held in the RAM 202.

The print server 105 determines whether the combination of output devices to execute divisional processing can be specified from the combination candidates by using the selection criterion order m (step S2603).

More specifically, when combination candidates are selected, a list as shown in FIG. 27 is generated on the basis of the function information of each output device included in the combinations. The priority is the same as described above. The speed can be acquired by causing the device manager to communicate with each output device. The processing time can be calculated from the acquired device processing speeds and the number of pages and copies of print data to be processed.

The work flow manager 602 specifies a combination to execute divisional processing from the combination candidates on the basis of the list information shown in FIG. 27.

The print server 105 determines whether one printing apparatus could be specified by the specifying processing (step S2603).

For example, in FIG. 25, the "device count" is set as the selection criterion order 1. However, in all combinations on the list of combination candidates shown in FIG. 27, the number of combined devices is two. That is, one printing apparatus cannot be specified yet. In this case, specifying processing is executed by using the next selection criterion order. The print server 105 executes processing m=m+1 (step S2604).

The specifying processing in step S1714 is implemented by repeating the above-described processing.

For example, in FIG. 25, "processing time" is selected as the criterion with the second priority. Hence, a combination with the shortest processing time is selected from the list in FIG. 27. As a result, combination 3 is determined as a combination to execute divisional processing. If no combination can be specified even by the processing in FIG. 26, the user may select a combination. A combination may be selected by the user without executing the processing in FIG. 26.

When the processing in FIG. 26 is executed, a combination desired by the user is automatically selected. Hence, even when a number of combination candidates capable of divisional processing are found, a combination to execute divisional processing can be specified without lowering the processing efficiency of the user.

The processing in step S1719 to specify a combination which minimizes the number of times of paper exchange will be described next with reference to the flowchart in FIG. 28.

The print server 105 recognizes paper types necessary for print data to be processed (step S2801). More specifically, this processing can be done by causing the work flow manager 602 to recognize the information listed in step S1702.

The print server 105 recognizes the information of paper types settable in each connected output device (step S2802). More specifically, this processing can be done by causing the work flow manager 602 to recognize the information listed in step S1703.

The print server 105 initializes a paper exchange count k (k=1) (step S2803). Next, a combination capable of executing print processing with the paper exchange count k is selected (step S2804). More specifically, the combination can be selected on the basis of the information acquired in steps S2801 and S2802. The processing is fundamentally the same as in step S1710.

In step S1710, a combination of output devices including all paper types necessary for the print data to be processed is selected. In step S2804, however, a combination is selected, which cannot include all paper types necessary for the print data to be processed but can include all paper types necessary for the print data to be processed by exchanging the paper type k times.

The print server 105 determines whether the combination capable of executing print processing by k-time exchange, which is selected in step S2804, is present (step S2805). If the combination is not present (NO in step S2805), increment processing (k=k+1) is executed in step S2807.

If it is determined in step S2805 that the combination capable of executing print processing by k-time exchange is present, the combination of output devices is displayed (step S2807). When a plurality of combinations capable of executing print processing by k-time exchange are present, the same specifying processing as in step S1714 is executed.

Even when there is no combination of printing apparatuses capable of executing print processing without executing paper type exchange during print processing, a combination of printing apparatuses capable of minimizing the number of times of paper type exchange can be provided. As a result, the number of times of paper type exchange becomes small, and the load on the operator can be minimized even exchange processing occurs.

Figure 28:
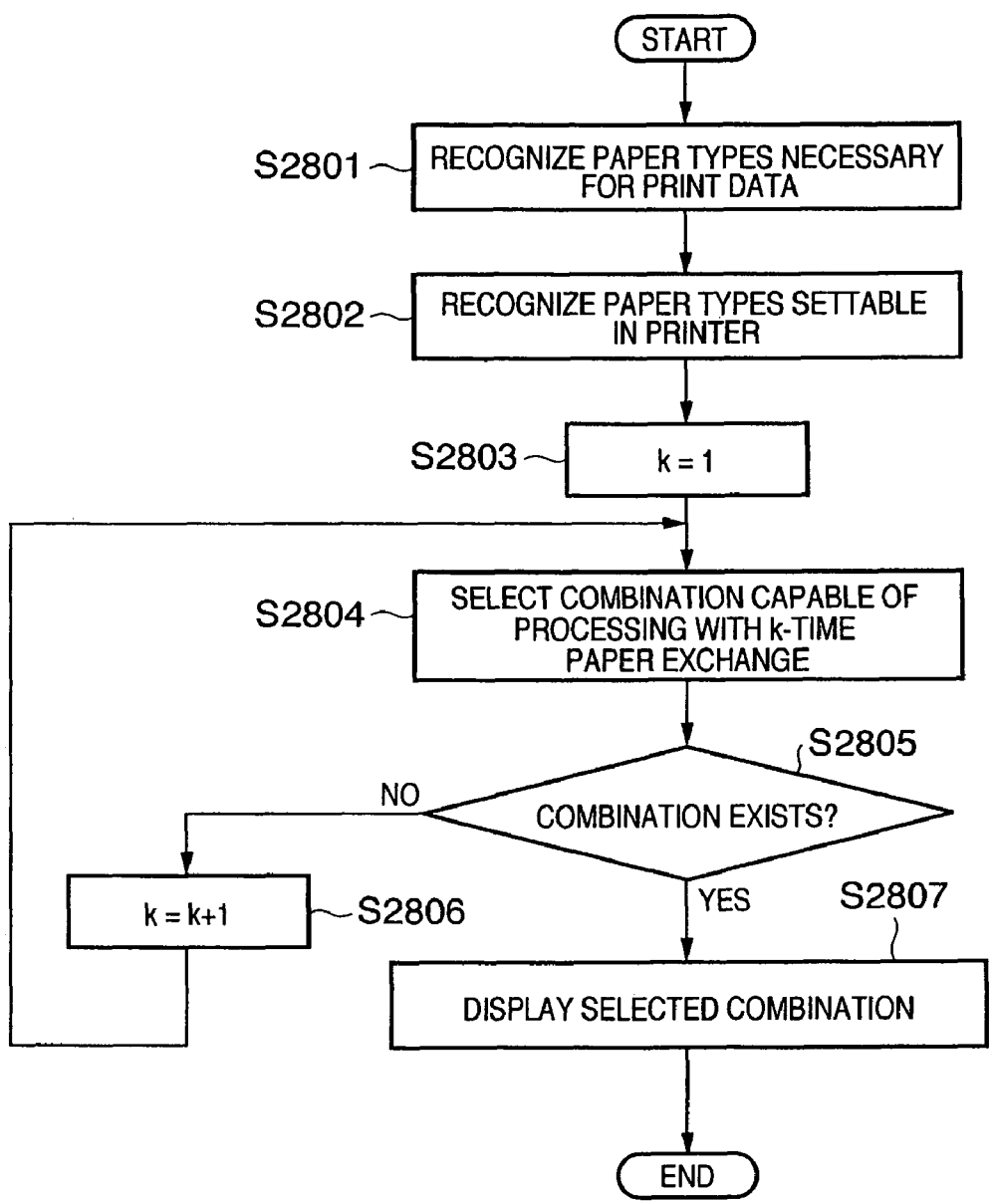
FIG. 28 is a flowchart showing processing of selecting a combination to implement the minimum cassette exchange count according to the embodiment of the present invention.

In the specifying method shown in FIG. 28, if no combination capable of executing print processing without paper exchange can be selected, a combination with a minimum number of times of exchange is specified. However, any other specifying method may be used.

As another specifying method, determination is done on the basis of whether a paper type to be exchanged is kept in hand. For example, assume that each of combinations 1 and 2 requires one exchange processing. In combination 1, "A4: plain paper" is to be set in a cassette during print processing. In combination 2, "A3: prophoto paper" is to be set.

When the paper type stock information held in the RAM 203 of the print server 105 is checked, it is confirmed that a large stock of "A4: plain paper" is present, although "A3: prophoto paper" is not in stock and must be prepared by order placement.

In this case, the print server 105 can select combination 1 that sets "A4: plain paper" interchangeable during print processing. That is, if no combination of printing apparatuses including the plurality of paper types necessary for print data can be selected, the work flow manager 602 recognizes paper types to be set during print processing.

The work flow manager 602 determines whether the recognized paper types can be set during print processing and select a combination capable of exchanging the paper types determined to be settable.

The paper type is determined to be settable when the work flow manager determines that the stock of paper type to be set during print processing is present. When both "A4: plain paper" and "A3: prophoto paper" are in stock, a paper type in larger stock may be selected.

With the above processing, a combination of printing apparatuses capable of not only minimizing the number of times of paper type exchange but also exchanging a paper type in stock is selected. Hence, exchange can be prevented from being impossible due to absence of stock.

As an example of document output by print control processing shown in FIGS. 17A and 17B, an example wherein the output speed changes depending on the division method will particularly be described with reference to FIG. 21. In the above-described example of document output shown in FIG. 16, the output speed of division means is not taken into consideration.

FIG. 21 is a view for explaining an example of document output according to the embodiment of the present invention in which the output speed based on the division means of an output device is taken into consideration.

Reference numerals 1801 to 1806 denote pages of print data to be output. Cardboard is designated for the pages 1801 and 1802 as a paper type, and plain paper is designated for the pages 1803 to 1806 as a paper type.

An output device 1807 is a printer capable of outputting cardboard at 30 PPM and plain paper at 60 PPM. The output device 1807 has paper cassettes in which paper types corresponding to P1 and P2 are set. An output device 1808 can output no cardboard but plain paper at 30 PPM. The output device 1808 has paper cassettes in which paper types corresponding to P3 to P6 are set.

The example shown in FIG. 21 assumes that, of the pages of print data, pages 1 and 2 for which cardboard is set as the paper type are allocated to the output device 1807, and pages 3 to 6 for which plain paper is set as the paper type are allocated to the output device 1808 on the basis of the paper types, thereby causing the two output devices to divisionally output the print data.

However, if the output devices to be used are decided simply on the basis of the paper type, the processing may not be ended in the shortest time. That is, most efficient processing cannot always be done by causing the output device 1807 to process pages 1 and 2 of cardboard and causing the output device 1808 to process pages 3 to 6 of plain paper as described above. The correspondence between an output device to be used and paper type must be decided in consideration of the function of each output device, the number of pages to be printed, and the paper types.

In the example shown in FIG. 21, the output device 1807 processes plain paper at 60 ppm and cardboard at 30 ppm, and the output device 1808 processes plain paper at 30 ppm. Each of the output devices 1807 and 1808 can include four paper cassettes.

FIG. 24 shows a calculation result of processing time necessary for each output device to decide the divisional output method capable of most efficient processing. FIG. 24 shows a table having list rows 2401 to 2403. In the example shown in FIG. 24, 30 copies of pages 1 and 2 (cardboard) and pages 3 to 6 (plain paper) are processed.

In divisional processing 1, a processing time for divisional output based on the paper type is described. The output device 1807 processes cardboard at 30 ppm. Processing page 1 (cardboard) takes 1 min, and processing page 2 (cardboard) takes 1 min. Hence, the output device 1807 requires a processing time of 2 min to process 30 copies of pages 1 and 2.

The output device 1808 processes plain paper at 30 ppm. Processing page 3 (plain paper) takes 1 min, and processing page 4 (plain paper) takes 1 min.

A processing time of 1 min is also necessary for processing each of pages 5 and 6. Hence, the output device 1808 requires a processing time of 4 min to process 30 copies of pages 3 to 6. Prom the above-described calculation result, the processing time of divisional processing 1 is calculated as 4 min.

In divisional processing 2, a processing time necessary when the output device 1807 processes pages 1 to 3 while the output device 1808 processes pages 4 to 6 is shown. The output device 1807 processes cardboard at 30 ppm and plain paper at 60 ppm, as described above.

The output device 1807 requires a processing time of 1 min (a total of 2 min) to process 30 copies of each of pages 1 and 2 (cardboard). The output device 1807 requires a time of 0.5 min to process 30 copies of page 3 (plain paper). Hence, the output device 1807 requires a processing time of 2.5 min to process pages 1 to 3.

The output device 1808 processes plain paper at 30 ppm. Hence, a processing time of 1 min (a total of 3 min) is required to process each of pages 4 to 6 (plain paper).

From the above-described calculation result, the processing time of divisional processing 2 is calculated as 3 min.

In divisional processing 3, a processing time necessary when the output device 1807 processes pages 1 to 4 while the output device 1808 processes pages 5 and 6 is shown.

The output device 1807 processes 30 copies of pages 1 and 2 (cardboard) in 1 min (a total of 2 min) and 30 copies of pages 3 and 4 (plain paper) in 0.5 min (a total of 1 min). The output device 1807 processes pages 1 to 4 in 3 min by using divisional processing 3. The output device 1808 processes 30 copies of each of pages 5 and 6 in 1 min (total of 2 min).

From the above-described calculation result, the processing time of divisional processing 3 is calculated as 3 min.

When the output devices 1807 and 1808 are to process pages 1 to 6 (30 copies), a divisional processing method capable of efficient processing in a shorter time can be selected without deciding output devices on the basis of the paper type.

When a plurality of divisional processing methods with the shortest processing time are calculated, as in the above-described example, the information is presented to the user to make him/her decide the divisional processing method to be used for processing.

As described above, according to this embodiment, in outputting print data, even the print data requires paper exchange in the conventional work flow, an output device capable of printing the print data without paper exchange is selected. Hence, efficient output without paper exchange during output can be implemented.

The characteristic effects of this embodiment are as follows.

One or a plurality of output devices (printers) are put in a group. An output device capable of output without paper exchange during output can be allocated to the output destination of print data to be processed. If output using a plurality of output devices is necessary, the print data to be processed is divisionally output (distributed-printed) such that fastest output can be done without paper type exchange. With this arrangement, the operation load can be reduced, and the output performance can be improved.

An output device capable of output without paper exchange can automatically selected to output by determining the type of paper sheets set in each paper feed stage of the output device.

If no output device capable of output without paper exchange is present, division of print data to be processed and paper types to be set in the paper feed stages of each output device are automatically decided. A window to promote exchange of necessary paper type is presented on the operation unit of the output device in advance to cause the operator to exchange the paper type, thereby omitting the paper exchange operation in actual output.

When a plurality of output devices are put in a group and print data to be processed is to be divided and divisionally output by the output devices put in the group, paper types are allocated to the paper feed stages of each output device such that fastest output can be implemented. In dividing print data, an optimum division point can be decided on the basis of the device information (e.g., the output speed for each paper type, paper type usable in each output device, and the number of paper feed stages prepared in each output device) of each output device. Alternatively, paper types to be set in the paper feed stages provided in each output device can be allocated such that optimum divisional output can be implemented.

When a print job to be processed and an output device as the output destination are selected, information representing whether printing can be done without paper exchange can be presented. When a plurality of output devices are selected, an output mode without paper exchange can be selected by selecting divisional output by division for each copy or divisional output by dividing print data.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-185215, filed Jun. 24, 2005 which is hereby incorporated by reference herein in its entirety.

What is claimed is:

1. An information processing apparatus for selecting a combination of printing apparatuses from among a plurality of printing apparatuses as a print destination of print data to be processed, comprising:
   a storing unit constructed to store device information about a paper of each printing apparatus;
   a selection unit constructed to select first and second combinations of printing apparatuses to process the print data on the basis of the device information stored by said storing unit and paper type information of a plurality of types of paper necessary for the print data to be processed, wherein the first and second combinations are different from each other;
   a setting unit constructed to set a priority order of a device count and a priority order of a processing time for the selected first and second combinations of printing apparatuses;
   a specifying unit constructed to automatically specify, from a plurality of combinations of printing apparatuses selected by said selection unit, one combination of printing apparatuses based on the priority orders, wherein said specifying unit (1) specifies the first combination of printing apparatuses when the priority order of the device count is higher than the priority order of the processing time and the number of printing apparatuses included in the first combination is less than the number of printing apparatuses included in the second combination, (2) specifies the second combination of printing apparatuses when the priority order of the device count is higher than the priority order of the processing time and the number of printing apparatuses included in the second combination is less than the number of printing apparatuses included in the first combination, and (3) specifies a combination which minimizes processing time from the first and second combinations when the priority order of the device count is higher than the priority order of the processing time and the number of printing apparatuses included in the first combination and the number of printing apparatuses included in the second combination are the same; and an output control unit constructed to divisionally output the print data to each printing apparatus included in the first or second combination specified by said specifying unit without changing an order of pages of the print data, wherein when it is impossible to select the combination of printing apparatuses including the plurality of paper types necessary for the print data, said selection unit selects a combination of hinting apparatuses which minimizes the number of times of paper exchange.

2. The apparatus according to claim 1, further comprising:
a recognition unit for recognizing a paper type to be set during print processing if it is impossible to select the combination of printing apparatuses including the plurality of paper types necessary for the print data; and
a set determination unit for determining whether the paper type recognized by said recognition unit can be set during print processing,
wherein said selection unit selects a combination to exchange the paper type determined by said set determination unit to be settable.

3. The apparatus according to claim 2, wherein when it is determined that the paper type to be set during print processing is in stock, said set determination unit determines that the paper type is settable.

4. The apparatus according to claim 1, further comprising an acquisition unit for acquiring the device information.

5. A method for an information processing apparatus of selecting a combination of printing apparatuses from among a plurality of printing apparatuses as a print destination of print data to be processed, comprising:
a storing step of storing device information about a paper of each printing apparatus;
a selection step of selecting first and second combinations of printing apparatuses to process the print data on the basis of the device information stored by said storing step and paper type information of a plurality of types of paper necessary for the print data to be processed, wherein the first and second combinations are different from each other;
a setting step of setting a priority order of a device count and a priority order of a processing time for the selected first and second combinations of printing apparatuses;
a specifying step of automatically specifying, from a plurality of combinations of printing apparatuses selected in the selection step, one combination of printing apparatuses based on the priority orders, wherein said specifying step (1) specifies the first combination of printing apparatuses when the priority order of the device count is higher than the priority order of the processing time and the number of printing apparatuses included in the first combination is less than the number of printing apparatuses included in the second combination, (2) specifies the second combination of printing apparatuses when the priority order of the device count is higher than the priority order of the processing time and the number of printing apparatuses included in the second combination is less than the number of printing apparatuses included in the first combination, and (3) specifies a combination which minimizes processing time from the first and second combinations when the priority order of the device count is higher than the priority order of the processing time and the number of printing apparatuses included in the first combination and the number of printing apparatuses included in the second combination are the same; and an output control step of divisionally outputting the print data to each printing apparatus included in the first or second combination specified by said specifying step without changing an order of pages of the print data,
wherein when it is impossible to select the combination of printing apparatuses including the plurality of paper types necessary for the print data, a combination of printing apparatuses which minimizes the number of times of paper exchange is selected in the selection step.

6. The method according to claim 5, wherein in the specifying step, a combination of printing apparatuses which maximizes a sum of priorities set for the printing apparatuses is specified from the combinations of printing apparatuses selected in the selection step.

7. The method according to claim 6, further comprising a transmitting step of transmitting exchange request information to request paper type exchange of a printing apparatus which should execute paper type exchange before print processing in a printing apparatus included in the combination of printing apparatuses, which includes the plurality of paper types necessary for the print data by exchanging the type of paper set in the paper feed stage before print processing.

8. The method according to claim 5, further comprising:
a recognition step of recognizing a paper type to be set during print processing if it is impossible to select the combination of printing apparatuses including the plurality of paper types necessary for the print data; and
a set determination step of determining whether the paper type recognized in the recognition step can be set during print processing,
wherein in the selection step, a combination to exchange the paper type determined in the set determination step to be settable is selected.

9. The method according to claim 8, wherein when it is determined that the paper type to be set during print processing is in stock, it is determined in the set determination step that the paper type is settable.

10. The method according to claim 5, further comprising an acquisition step of acquiring the device information.

11. A non-transitory computer-readable storage medium storing a computer-executable program for execution by an information processing apparatus for selecting a combination of printing apparatuses from among a plurality of printing apparatuses as a print destination of print data to be processed, comprising:
a storing step of storing device information about a paper of each printing apparatus;
a selection step of selecting first and second combinations of printing apparatuses to process the print data on the basis of the device information stored by said storing step and paper type information of a plurality of types of paper necessary for the print data to be processed, wherein the first and second combinations are different from each other;
a setting step of setting a priority order of a device count and a priority order of a processing time for the selected first and second combinations of printing apparatuses;
a specifying step of automatically specifying, from a plurality of combinations of printing apparatuses selected by said selection step, one combination of printing apparatuses based on the priority order, wherein said specifying step (1) specifies the first combination of printing apparatuses when the priority order of the device count is higher than the priority order of the processing time and the number of printing apparatuses included in the first combination is less than the number of printing apparatuses included in the second combination, (2) specifies the second combination of printing apparatuses when the priority order of the device count is higher than the priority order of the processing time and the number of printing apparatuses included in the second combination is less than the number of printing apparatuses included in the first combination, and (3) specifies a combination which minimizes processing time from the first and second combinations when the priority order of the device count is higher than the priority order of the processing time and the number of printing apparatuses included in the first combination and the number of printing apparatuses included in the second combination are the same; and an output control step of divisionally outputting the print data to each printing apparatus included in the first or second combination specified by said specifying step without changing an order of pages of the print data, wherein when it is impossible to select the combination of printing apparatuses including the plurality of paper types necessary for the print data, a combination of printing apparatuses which minimizes the number of times of paper exchange is selected in the selection step.

* * * * *